(12) United States Patent
Standley et al.

(10) Patent No.: US 9,858,127 B2
(45) Date of Patent: Jan. 2, 2018

(54) CONFIGURABLE PLATFORM ARCHITECTURE AND METHOD FOR USE THEREOF

(71) Applicant: Societal Innovations IPCO Limited, London (GB)

(72) Inventors: Douglas A. Standley, Boulder, CO (US); Randall E. Bye, Louisville, CO (US); Bill C. Hardgrave, Auburn, AL (US); David M. Sherr, Pleasant Hill, CA (US)

(73) Assignee: D. Alan Holdings, LLC, Irving, TX (US)

( * ) Notice: Subject to any disclaimer, the term of this patent is extended or adjusted under 35 U.S.C. 154(b) by 0 days.

(21) Appl. No.: 15/193,909

(22) Filed: Jun. 27, 2016

(65) Prior Publication Data
US 2016/0306683 A1    Oct. 20, 2016

Related U.S. Application Data

(63) Continuation of application No. 13/973,342, filed on Aug. 22, 2013, now Pat. No. 9,378,055.

(60) Provisional application No. 61/692,142, filed on Aug. 22, 2012.

(51) Int. Cl.
G06F 9/46        (2006.01)
G06F 9/54        (2006.01)
G06F 9/48        (2006.01)

(52) U.S. Cl.
CPC ............ *G06F 9/541* (2013.01); *G06F 9/4843* (2013.01); *G06F 9/542* (2013.01)

(58) Field of Classification Search
None
See application file for complete search history.

(56) References Cited

U.S. PATENT DOCUMENTS

| | | |
|---|---|---|
| 6,401,081 B1 | 6/2002 | Montgomery et al. |
| 7,028,162 B2 | 4/2006 | Arnold et al. |
| 7,222,349 B1 | 5/2007 | Krinke, II et al. |
| 7,337,436 B2 | 2/2008 | Chu et al. |
| 7,653,008 B2 | 1/2010 | Patrick et al. |
| 7,836,458 B1 | 11/2010 | Gwozdz et al. |
| 7,844,803 B2 | 11/2010 | De Oliveira Kastrup Pereira et al. |

(Continued)

FOREIGN PATENT DOCUMENTS

| | | |
|---|---|---|
| CN | 201310524752 | 10/2013 |
| CN | 201310500856 | 1/2014 |

(Continued)

OTHER PUBLICATIONS

Guinard et al. "Cloud Computing, REST and Mashups to Simplify RFID Application Development and Deployment" Jun. 2011.*

(Continued)

*Primary Examiner* — Sisley Kim

(57) ABSTRACT

A platform architecture that is configurable to provide task specific application instances compatible with one or more hosts is provided with a method for using the architecture. In one example, the platform architecture provides a transducer functionality block, a conduit functionality block, an application functionality block, and an application programming interface (API) functionality block on which each task specific application instance is based.

5 Claims, 24 Drawing Sheets

(56) References Cited

U.S. PATENT DOCUMENTS

| | | | |
|---|---|---|---|
| 7,899,160 | B2 | 3/2011 | Corcoran |
| 7,926,030 | B1 | 4/2011 | Harmon |
| 7,953,767 | B2 | 5/2011 | Shaburov |
| 7,958,340 | B2 | 6/2011 | Hoover et al. |
| 7,971,187 | B2 | 6/2011 | Sanghvi et al. |
| 8,099,583 | B2 | 1/2012 | Wang |
| 8,161,500 | B2 | 4/2012 | Tan et al. |
| 8,260,479 | B2 | 9/2012 | Christenson et al. |
| 8,261,295 | B1 | 9/2012 | Risbood et al. |
| 8,325,228 | B2 | 12/2012 | Mariadoss |
| 8,589,873 | B2 | 11/2013 | Baek |
| 8,869,095 | B2 | 10/2014 | Long et al. |
| 8,880,524 | B2 | 11/2014 | Pandey et al. |
| 9,069,375 | B2 | 6/2015 | Padmavilasom |
| 2003/0126584 | A1 | 7/2003 | Creamer |
| 2003/0135842 | A1 | 7/2003 | Frey et al. |
| 2003/0149608 | A1 | 8/2003 | Kall et al. |
| 2003/0200532 | A1 | 10/2003 | Gensel |
| 2006/0116138 | A1 | 6/2006 | Simsek et al. |
| 2007/0025351 | A1 | 2/2007 | Cohen |
| 2007/0233717 | A1 | 10/2007 | Prabhakar et al. |
| 2009/0037875 | A1 | 2/2009 | Jones et al. |
| 2009/0091442 | A1 | 4/2009 | Howarth et al. |
| 2010/0138825 | A1 | 6/2010 | Harrop |
| 2011/0021142 | A1 | 1/2011 | Desai et al. |
| 2011/0072441 | A1 | 3/2011 | Parks |
| 2011/0131557 | A1 | 6/2011 | Bouillet et al. |
| 2013/0061231 | A1 | 3/2013 | Zhang et al. |
| 2013/0083843 | A1 | 4/2013 | Bennett |
| 2013/0262330 | A1* | 10/2013 | Sannier ............. G06Q 30/0185 705/318 |
| 2013/0290450 | A1 | 10/2013 | Butler et al. |
| 2014/0040861 | A1 | 2/2014 | Kim et al. |
| 2014/0118153 | A1 | 5/2014 | Li |
| 2014/0351800 | A1 | 11/2014 | Jao et al. |
| 2015/0169302 | A1 | 6/2015 | DeAnna et al. |

FOREIGN PATENT DOCUMENTS

| | | |
|---|---|---|
| EP | 01372071 | 12/2003 |
| WO | WO2006135726 | 12/2006 |
| WO | WO2011001347 | 1/2011 |
| WO | WO2015177639 A1 | 11/2015 |

OTHER PUBLICATIONS

Coulson, G., et al.; The Design of a Configurable and Reconfigurable Middleware Platform; Distributed Computing, Apr. 2002, pp. 109-126, vol. 15, Issue 2 Apr. 1, 2002.

Wheater, S., et al.; The Design and Implementation of a Framework for Configurable Software; IEEE Computer Society, ICCDS '96 Proceedings of the IEEE Third International Conference on Configurable Distributed Systems, May 6, 1996, p. 136. May 6, 1996.

SAS Event Stream Processing Engine; SAS Institute Inc., 2014, downloaded Jul. 2, 2014. Jul. 2, 2014.

Carney, D., et al.; Monitoring Streams—A New Class of Data Management Applications; VLDB '02: Proceedings of the 28th International Conference on Very Large Databases, 2002, pp. 215-226. Jan. 1, 2002.

Michelson, B.; Event-Driven Architecture Overview; Elemental Links, Inc., 5th Anniversary Edition, Feb. 2, 2011, originally published Feb. 2, 2006. Feb. 2, 2006.

Zaharia, M.; An Architecture for Fast and General Data Processing on Large Clusters; Technical Report No. UCB/EECS-2014-12, Feb. 3, 2014. Feb. 3, 2014.

Leclercq, M., et al.; DREAM: A Component Framework for Constructing Resource-Aware, Configurable Middleware; IEEE Computer Society, Distributed Systems Online, Sep. 2005, vol. 6, No. 9. Sep. 1, 2005.

Zhang, Y., et al.; Configurable Middleware for Distributed Real-Time Systems with Aperiodic and Periodic Tasks; IEEE Computer Society, IEEE Transactions on Parallel and Distributed Systems, Mar. 2010, vol. 21., No. 3; published online Apr. 17, 2009. Apr. 17, 2009.

Bhattacharya, D., et al.; Analytics on Big Fast Data Using Real Time Stream Data Processing Architecture; EMC Corporation, Jul. 5, 2013. Jul. 5, 2013.

Coulson, G.; A Configurable Multimedia Middleware Platform; IEEE Press, IEEE Multimedia, Jan.-Mar. 1999, pp. 62-76, vol. 6, No. 1. Jan. 1, 1999.

Nogiec, J., et al.; A Configurable Component-Based Software System for Magnetic Field Measurements; Sep. 1, 2005, FERMILAB-CONF-05-395-TD; Presented at MT-19: 19th International Conference on Magnet Technology, Genoa, Italy, Sep. 18-23, 2005 Sep. 1, 2005.

Hsueh, N., et al.; A Configurable and Extensible Middleware Design for Mobile Application Integration; Journal of Software Engineering 8, Mar. 8, 2014, pp. 1-13. Mar. 8, 2014.

Moxey, C., et al.; A Conceptual Model for Event Processing Systems; IBM Corporation, an IBM Redguide publication, Mar. 23, 2010, downloaded Dec. 1, 2015, from http://www.redbooks.ibm.com/redpapers/pdfs/redp4642.pdf. Mar. 23, 2010.

The Ultimate IFTTT Guide: Use the Web's Most Powerful Tool Like a Pro; Oct. 8, 2013, downloaded Oct. 19, 2015, from http://www.makeuseof.com/tag/the-ultimate-ifttt-guide-use-the-webs-most-powerful-tool-like-a-pro/. Oct. 8, 2013.

D'Orazio, D.; A recipe for news: IFTTT adds New York Times support, more publications coming; The Verge, Aug. 12, 2013, downloaded Oct. 19, 2015, from http://www.theverge.com/2013/8/12/4607076/ifttt-adds-new-york-times-channel-to-service. Aug. 12, 2013.

Madden, S., et al.; Fjording the Stream: An Architecture for Queries over Streaming Sensor Data; "Draft submitted for Publication, Jun. 26, 2001." Downloaded on Dec. 1, 2015, from http://www.cs.berkeley.edu/~franklin/Papers/fjords0601.pdf. Jun. 26, 2001.

Abadi, D., et al.; The Design of the Borealis Stream Processing Engine; Proceedings of the Second Biennial Conf. Innovative Data Systems Research (CIDR '05), 2005. Jan. 1, 2005.

Hwang, J., et al.; A Cooperative, Self-Configuring High-Availability Solution for Stream Processing; IEEE 23rd International Conference on Data Engineering, 2007. Jan. 1, 2007.

Stefanov, T., et al.; System Design using Kahn Process Networks: The Compaan/Laura Approach; IEEE, Proceedings of the Design, Automation, and Test in Europe Conference and Exhibition (DATE '04), pp. 340-345, vol. 1, 2004. Jan. 1, 2004.

Kamburugamuve, S.; Survey of Distributed Stream Processing for Large Stream Sources; For the PhD Qualifying Exam, Dec. 14, 2013. Dec. 14, 2013.

Standley, D., et al.; U.S. Appl. No. 13/973,342 (non-published); filed Aug. 22, 2013. dated Aug. 22, 2013.

Cetintemel, U., et al.; The Aurora and Borealis Stream Processing Engines; Downloaded Jul. 2, 2014, from http://homes.cs.washington.edu/~magda/borealis-book.pdf. Jul. 2, 2014.

Riehle, D.; Framework Design: A Role Modeling Approach; Ph.D. Thesis, No. 13509. Zurich, Switzerland, ETH Zurich, 2000. Jan. 1, 2000.

PCT: International Search Report and Written Opinion of PCT/IB15/01288 (related application), 15 pgs. dated Nov. 10, 2015.

Guinard, Dominique, et al., Cloud Computing, REST and Mashups to Simplify RFID Application Development and Deployment, Jun. 2011, 6 pages Jun. 1, 2011.

PCT: International Search Report and Written Opinion of PCT/IB15/00427 (related application), 16 pages dated Jun. 27, 2016.

Calmant T., et al.; Database Compendex [Online]; A dynamic and service-oriented component model for python long-lived applications, XP002758638, Database accession No. E20123015277520 abstract 2012.

Anonymous: "Docker storage 101: How storage works in Docker", XP55294909, Retrieved from the Internet: URL: http://www.computerweekly.com/feature/Docker-storage-101-How-storage-works-in-Docker [retrieved on Aug. 10, 2016] the whole document Apr. 30, 2015.

Van Der Hoek C., et al.; Composition Environments for Deployable Software Components (Technical Report UCI-ICS-02-18 Depart-

(56) References Cited

OTHER PUBLICATIONS ment of Information and Computer Science, University of Claifornia); Internet Citation; Aug. 22, 2002; XP007901280 Aug. 22, 2002.
PCT: International Search Report and Written Opinion of PCT/IB16/00554 (related application), 13 pages dated Aug. 26, 2016.
PCT: International Search Report and Written Opinion of PCT/IB16/00839 (related application), 11 pages dated Aug. 30, 2016.

\* cited by examiner

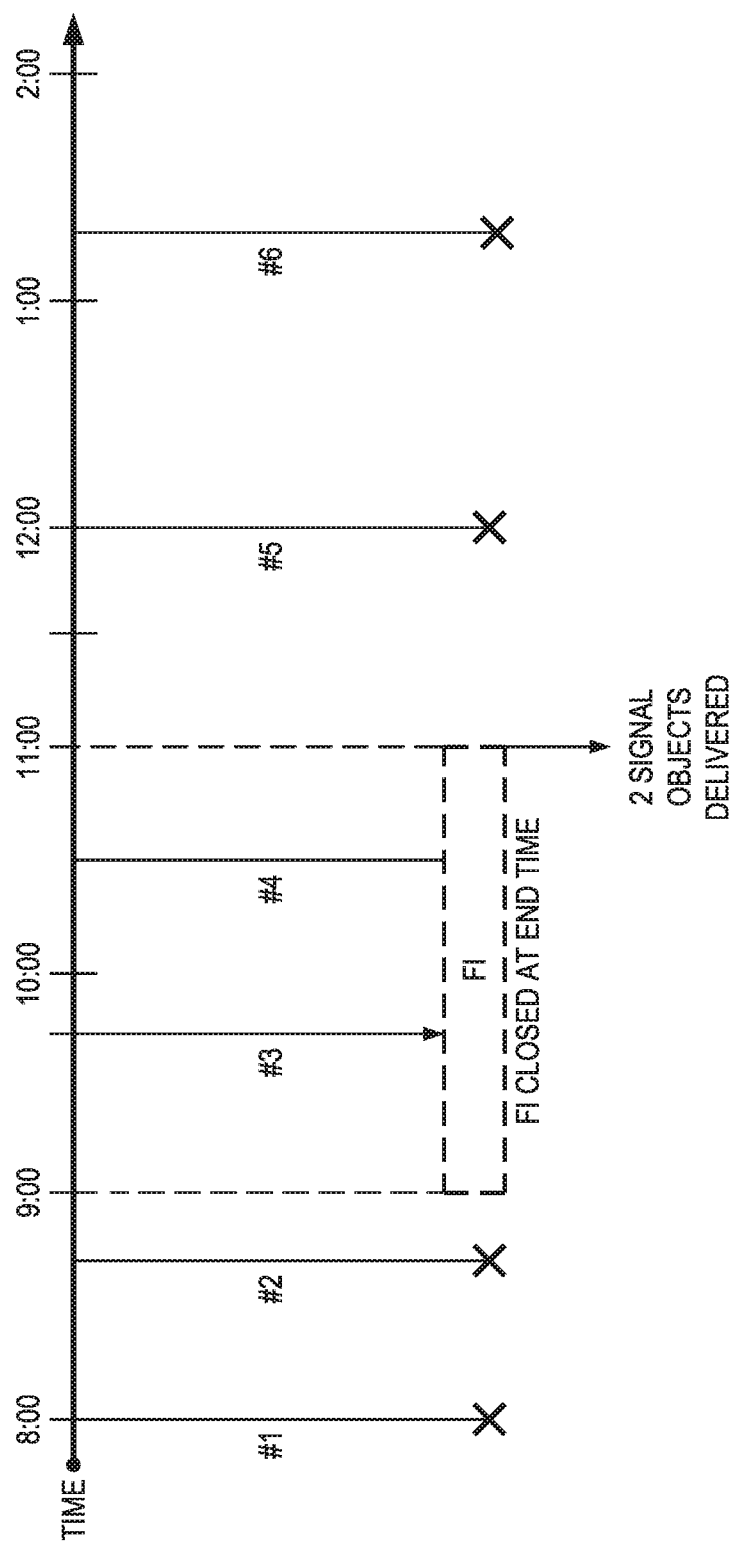

CONFIGURABLE PLATFORM ARCHITECTURE AND METHOD FOR USE THEREOF

CROSS-REFERENCE TO RELATED APPLICATIONS

This application is a continuation of U.S. patent application Ser. No. 13/973,342, filed on Aug. 22, 2013, entitled CONFIGURABLE PLATFORM ARCHITECTURE AND METHOD FOR USE THEREOF, which issued as U.S. Pat. No. 9,378,055 on Jun. 28, 2016. Application Ser. No. 13/973,342 claims benefit of U.S. Provisional Application No. 61/692,142, filed on Aug. 22, 2012, entitled CONFIGURABLE PLATFORM ARCHITECTURE AND METHOD FOR USE THEREOF. U.S. patent application Ser. No. 13/973,342 and 61/692,142, and U.S. Pat. No. 9,378,055 are incorporated by reference herein in their entirety.

BACKGROUND

The proliferation of computer devices has resulted in the production of tremendous amounts of data that compounds every year. Current processing methods are unsuitable for handling this data. Accordingly, what is needed are a system and method that address this issue.

BRIEF DESCRIPTION OF THE DRAWINGS

For a more complete understanding, reference is now made to the following description taken in conjunction with the accompanying Drawings in which:

FIGS. 6C and 6D are diagrams illustrating embodiments of time intervals;

DETAILED DESCRIPTION

Figure 1A:
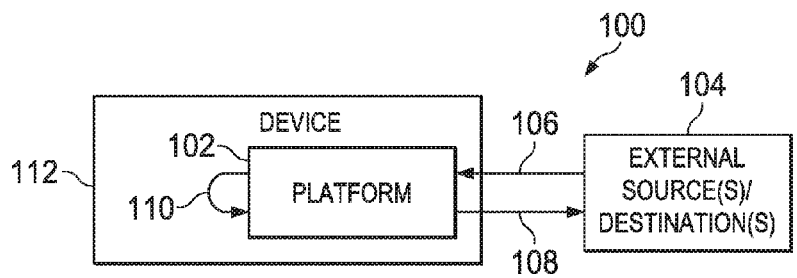
FIGS. 1A-1D are diagrams of embodiments of environments in which a platform capable of receiving and processing a high volume of input signals in real time or near real time may be deployed.

The present disclosure is directed to a system and method for a platform architecture capable of receiving, processing, and/or acting on any input signal in real time or near real time. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1A, in one embodiment, an environment 100 is illustrated with a platform 102. The platform 102 supports instance to instance or device and system, which provides for a host to subscribe from and publish to one or more other hosts broadly or specifically to a single application logic/context requirement. The platform 102 provides functionality needed to receive, process, and/or act on any input signal received from one or more external sources 104 (as represented by arrow 106) and/or from the platform 102 itself (as represented by arrow 110). Once the input signal is handled as defined by the configuration of the platform 102, the input signal and/or other signals that may result from processing may be output to one or more external destinations 104 (as represented by arrow 108) and/or to the platform 102 itself (as represented by arrow 110).

In the present embodiment, the input signals are not stored except for queuing (if needed), and no database or other permanent storage mechanism need be used for information handled by the platform 102. As the received input signals are handled in real time or near real time and the platform 102 is not constrained by database access limitations, throughput may occur at a much higher rate than can be achieved in systems that rely on database access.

In some embodiments, the platform 102 allocates and de-allocates functionality as needed, thereby minimizing the platform's footprint.

The platform 102 provides its functionality via a generic architecture that may be configured to address specific needs. Although the architecture may be implemented as an application specific integrated circuit (ASIC) or as another application specific embodiment, the architecture itself is configurable and, accordingly, highly flexible. Furthermore, the architecture is able to process signals in one instance and then pass the processed signals back to itself for further processing. This ability to internally link application instances enables the architecture to run multiple related applications simultaneously. With each application being fully configurable, the architecture is able to rapidly process large amounts of information while also providing highly customizable outputs.

The platform 102 may be implemented in a manner that is relatively operating system (OS) independent. For example, the platform 102 may be implemented using a language such as Python. To provide additional OS neutrality, design decisions may include avoiding the use of library calls that are OS specific and/or may avoid the inclusion of modules that are OS specific.

The platform 102 provides self-awareness functional capability in one or more areas, including the dynamic allocation and de-allocation of signals and conduits (discussed later in detail), and through applications, advanced dynamic context artificial intelligence, and/or system monitoring. With respect to applications, pre-configured applications may be based on specific indices relating to signal type and source, level of awareness function, and actions. The applications may be utilized for device and/or system diagnostics and quality control. With respect to advanced dynamic context artificial intelligence, custom developed composite context within an algorithm resident within the platform 102 may be specific to a use case, business process, system of devices or signal producers, or a single device specification.

With respect to system monitoring, because sensors reside inside of the platform 102, sensor signals may monitor the state or condition of the platform 102 as a self-aware system. Transducers (discussed later in detail) then generate signal objects corresponding to the current state of the platform 102. Details contained in such signal objects may range from the amount of central processing unit (CPU) usage of the platform 102 to an error generated from one aspect of the platform 102. These signal objects can then be processed by applications and combined with internal actions to create a self-aware and proactive system monitoring solution. Additionally, a separate instance of the platform 102 can be set up to apply this system monitoring logic and the signal objects from the internal monitoring transducer can be sent there through the conduit API (discussed later in detail).

The platform 102 may be stored and executed on a device 112. The platform 102 may be an application residing on the device 112 and/or may be embedded in the device 112. Examples of the device 112 include single-board computing (SBC) and onboard computing (OBC) platforms, cellular telephones (including smart phones), personal digital assistants (PDAs), netbooks, tablets, laptops, desktops, workstations, servers, equipment (e.g., manufacturing equipment, monitoring equipment, and security equipment), and any other device that is able to execute instructions and support some or all of the architecture of the platform 104.

Communications to and from the platform 102 may be direct (e.g., via a peer-to-peer network, an ad hoc network, or using a direct connection), indirect, such as through a server or other proxy (e.g., in a client-server model or a wireless network), or may use a combination of direct and indirect communications.

Figure 1B:
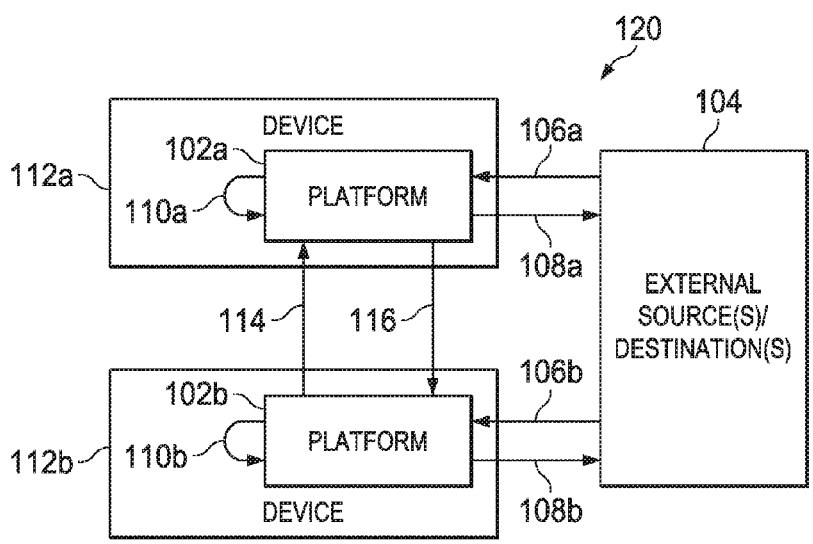

Referring to FIG. 1B, one embodiment of an environment 120 is illustrated where the functionality provided by the platform 102 is distributed as represented by platforms 102a and 102b on devices 112a and 112b, respectively. Although only two platforms 102a and 102b are shown, it is understood that the functionality may be distributed across many devices. The distributed platforms 102a and 102b may communicate with one another (as represented by arrows 114 and 116). Each distributed platform 102a and 102b may communicate with the external source/destination 104, only a particular one of the platforms 102a and 102b may be configured for communication with the external source/destination 104, or one platform 102a or 102b may be configured to receive communications from the external source 104, while the other of the platforms may be configured to send communications to the external destination 104.

In another embodiment of FIG. 1B, each platform 102a and 102b may be a complete platform with full functionality, and may be configured to communicate with one another and/or with the external source/destination 104 in order to accomplish designated tasks. In such embodiments, one platform 102a or 102b may be offline unless needed (e.g., if the other platform fails or becomes overloaded). In other embodiments, although each platform 102a and 102b provides full functionality, some functionality on one or both platforms may not be used. This enables the same platform to be used on multiple devices while still allocating particular functionality to one or more specific devices.

Figure 1C:
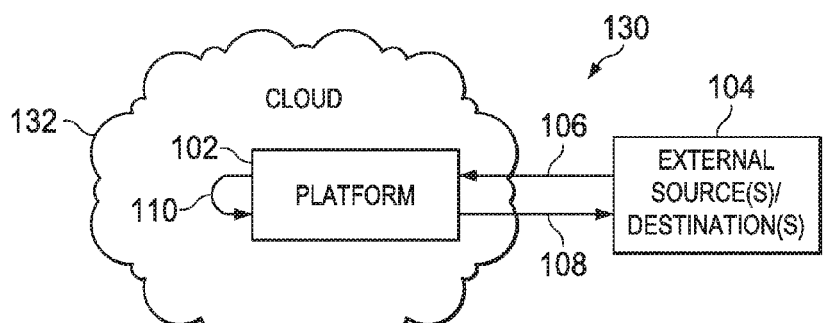

Referring to FIG. 1C, one embodiment of an environment 130 is illustrated where some or all of the functionality provided by the platform 102 is provided by one or more storage and/or processing systems 132 that provides services from one or more remote locations, such as is provided by cloud computing. It is understood that the storage and/or processing systems 132 may have distributed control, with functionality provided by different entities and combined within the platform 102.

Figure 1D:
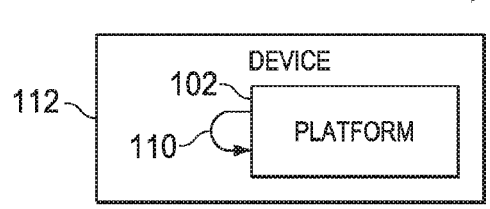

Referring to FIG. 1D, one embodiment of an environment 140 is illustrated where some or all of the functionality provided by the platform 102 is used only within the device 112. In the present embodiment, the device 112 does not communicate with external source/destinations 104 unless needed for installation, maintenance, and/or configuration purposes. It is understood that the environments of FIGS. 1A-1D may be combined in various ways. For example, the functionality of the platform 102 may be distributed between the device 102a and the cloud 132.

Figure 2A:
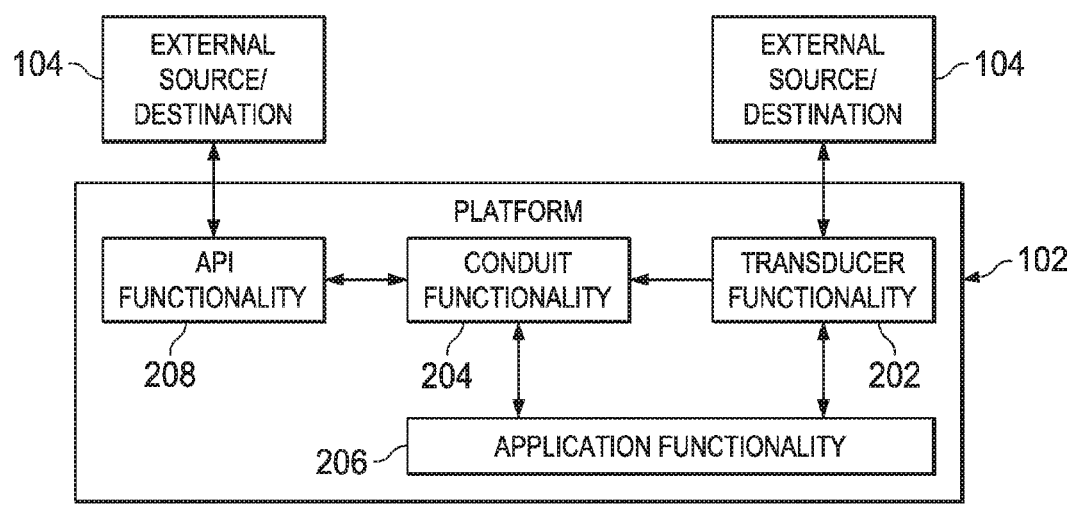
FIG. 2A is a diagram illustrating a more detailed embodiment of the platform of FIGS. 1A-1C.

Referring to FIG. 2A, one embodiment of the platform 102 of FIG. 1 is illustrated in greater detail with blocks representing functionality provided by the platform 102. The platform 102 includes a transducer functionality block 202, a conduit functionality block 204, an application functionality block 206, and application programming interface (API) functionality block 208. Although input signals generally enter the platform 102 through a transducer of the transducer functionality block 202 and/or through the API functionality block 208, other entry points may exist as will be described below.

Generally, input signals enter the platform 102 via the transducer functionality block 202. The transducer functionality block 202, which may or may not perform processing on the input signals, generates signal objects that can be processed by other parts of the platform 102. The signal objects may be an internal object structure that can be handled by the platform 102 without additional conversion of the input signals past the transducer functionality block 202. More specifically, the transducer functionality block 202 provides transducers having the ability to inject signal objects into conduits of the conduit functionality block 204. The transducers may range greatly in complexity. For example, a simple transducer may generate and publish a signal object at a designated time (e.g., every five minutes), while a more complex transducer may rely on an external API and either poll or receive streaming messages through a socket. In the latter case, the transducer acts as a translator in that it takes a message that can be in any form and converts it to a signal object for later processing. Accordingly, transducers have the ability to both add dynamic context and enrich signal objects and play a role in maintaining the neutrality of the platform 102. Transducers may be turned off and on via an API (e.g., a REpresentational State Transfer (REST) style architecture API). The REST API allows for applications, transducers, and/or other features of the platform 102 to be started and stopped.

The transducer functionality block 202 publishes the signal objects to the conduit functionality block 204, which in turn makes the signal objects available to the application functionality block 206. More specifically, conduits of the transducer functionality block 202 act as pipelines and queues to the application functionality block 206. The conduits receive signal objects from a variety of sources and maintain them (e.g., queue them) until the signal objects are removed from the queue by an application of the application functionality block 206 or an API subscriber of the API functionality block 208. Queuing may be handled in a variety of ways, including the use of memory/random access memory (RAM) and/or other mechanisms such as a persistence layer (e.g., an SQLite persistence layer). Conduits are dynamic in that if there are no active publishers to a particular conduit, that conduit is closed.

The application functionality block 206, which may be configured in different ways as will be described later in greater detail, performs processing on the signal objects. The processing may include discarding signal objects, adding dynamic context to signal objects, passing signal objects on without processing, and/or taking defined actions based on the signal objects. If the application functionality block 206 does not discard a particular signal object, the application functionality block 206 may pass that signal object and/or other objects that may result from processing to the conduit functionality block 204 for output. In some embodiments, the API functionality block 208 may be used for output. If an action is to be taken, the application functionality block 206 may perform the action via an actuation mechanism or may send a message instructing that an action be performed.

Applications of the application functionality block 206 may be viewed as collections of one or more of the following: pre-adapters, dynamic context blocks, post-adapters, and actions, each of which will be described later in greater detail. Adapters and dynamic context blocks have the ability to dynamically de-allocate (e.g., discard) signal objects after the signal objects are no longer needed. Additionally, adapters may be used to enrich existing signal objects, as well as create completely new signal objects for later use. Adapters may also interact with network content and add dynamic context to and/or enrich signal objects based on an external state. After running a series of optional adapters and dynamic context blocks, an application has the option to execute an action (e.g., a notification and/or actuation).

Figure 2B:
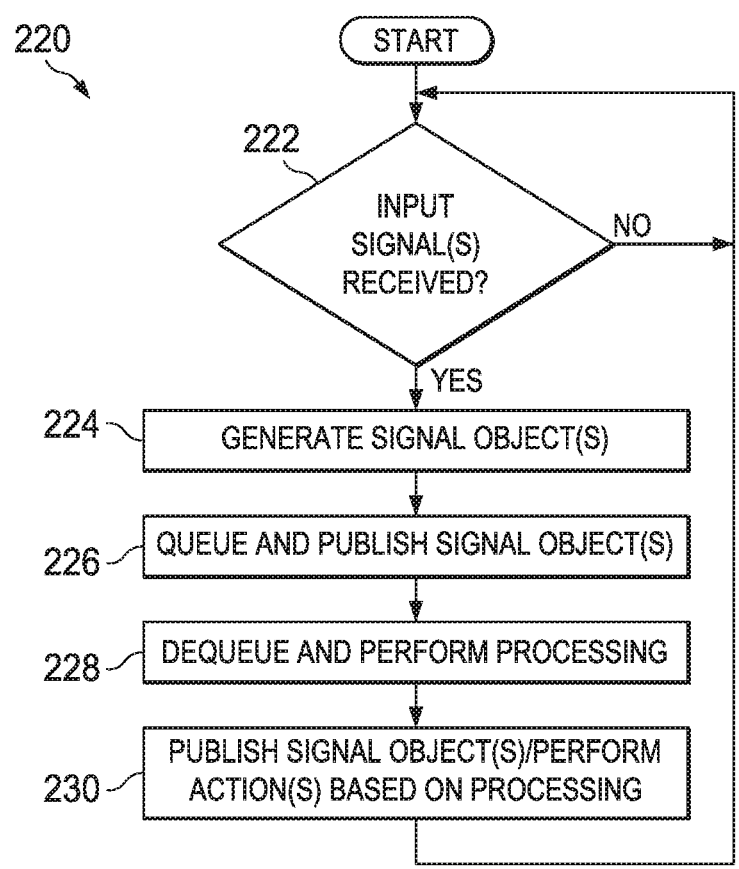
FIG. 2B is a flow chart illustrating one embodiment of a method that may be used with the platform of FIG. 2A.

Referring to FIG. 2B, a method 220 illustrates one embodiment of a process by which an input signal may be handled by the platform 102 of FIG. 2A. The method 220 is described with respect to a single input signal for purposes of clarity, although it is understand that hundreds, thousands, or even larger numbers of input signals may be received before the method 220 processes the first input signal that was received. Accordingly, various queuing mechanisms may be used as temporary storage for incoming signals and for internal signal objects while the method 220 is being executed. However, it is understood that all such queuing is temporary in nature and neither the input signals nor the signal objects that are generated based on the input signals are stored longer than is needed for that input signal/signal object to be processed by the platform 102. Accordingly, at no time is an input signal/signal object stored in a database from the time of receipt (e.g., step 222) through the final step (e.g., step 232). While database storage may occur after the method 220 is finished (e.g., database storage may be an action taken in step 232), queuing within the platform 102 may typically store a given signal/signal object for fractions of a second to a relatively few seconds (e.g., less than a minute).

In step 222, a determination may be made as to whether an input signal has been received. If no input signal has been received, the method 220 repeats step 222 until such time as the method 220 is ended or an input signal is received. If an input signal is received as determined in step 222, the method 220 moves to step 224. In step 224, one or more signal objects are generated based on the input signal. In step 226, the signal object is queued and published for use by one or more applications. In step 228, the signal object is dequeued and processed by an application. In step 230, one or more signal objects may be published and/or actions may be taken based on the processing of the signal object.

Figure 3:
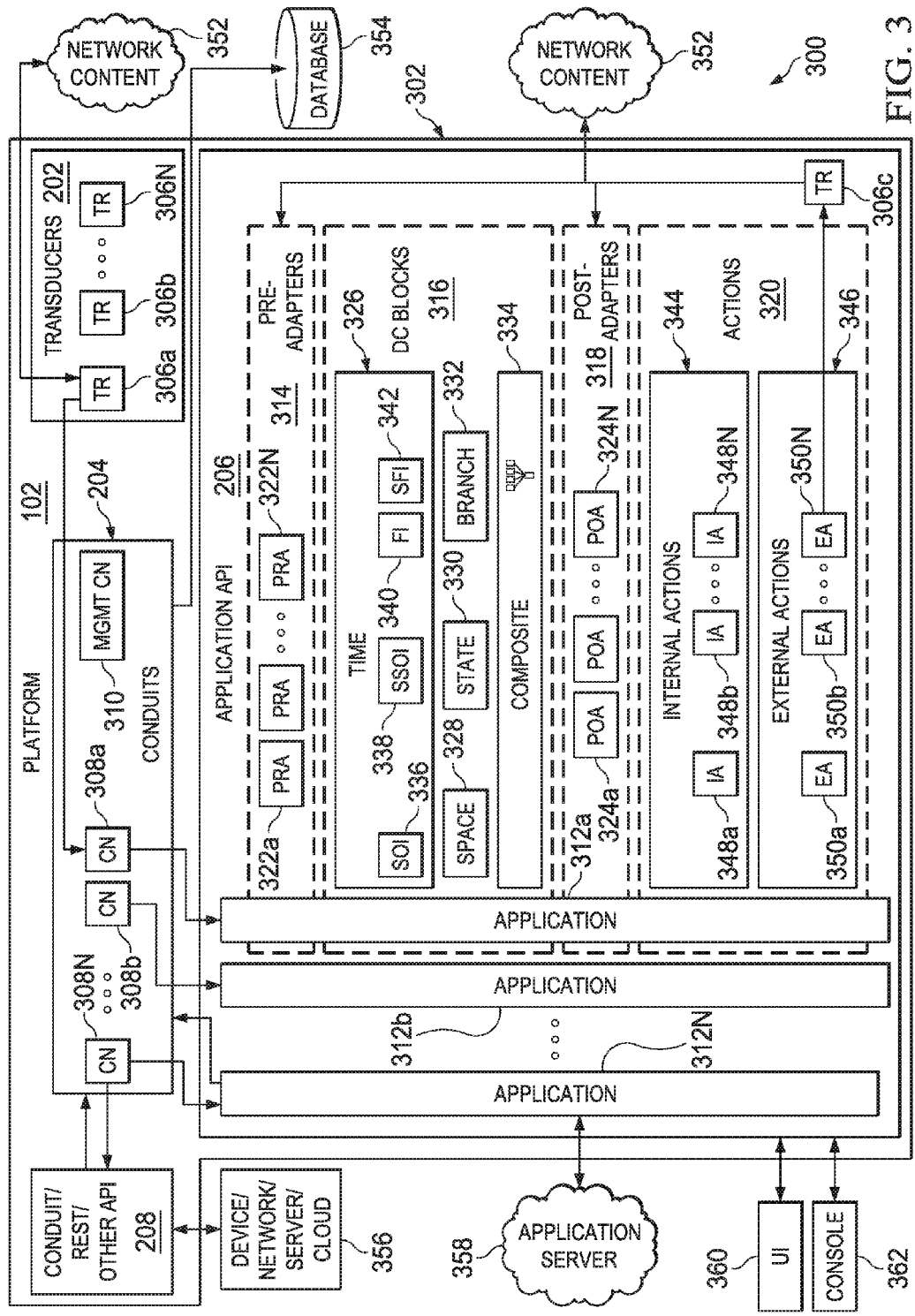
FIG. 3 is a diagram illustrating a more detailed embodiment of the platform of FIG. 2B.

Referring to FIG. 3, one embodiment of the platform 102 of FIG. 2 is illustrated in greater detail in an environment 300. In the present embodiment, the transducer functionality block 202, conduit functionality block 204, application functionality block 206 (represented as an application API), and API functionality block 208 are provided as part of an architecture 302 that may be used to implement the platform 102.

The transducer functionality block 202 includes one or more transducers 306a-306N, where N is the total number of transducers on the platform 102. Using the transducer 306a as an example, the transducer 306a is configured to convert a neutral input signal (e.g., a message, event, data stream, and/or service request) into an internal signal object by generating the signal object when the input signal is received. The signal object may then be published by the transducer 306a via one or more conduits of the conduit functionality block 204 for handling by the platform 102. In some embodiments, the transducer 306a may perform additional processing on the input signal and/or the signal object, while in other embodiments the transducer 306a may simply convert the incoming input signal into an internal signal object without additional processing.

Figure 4A:
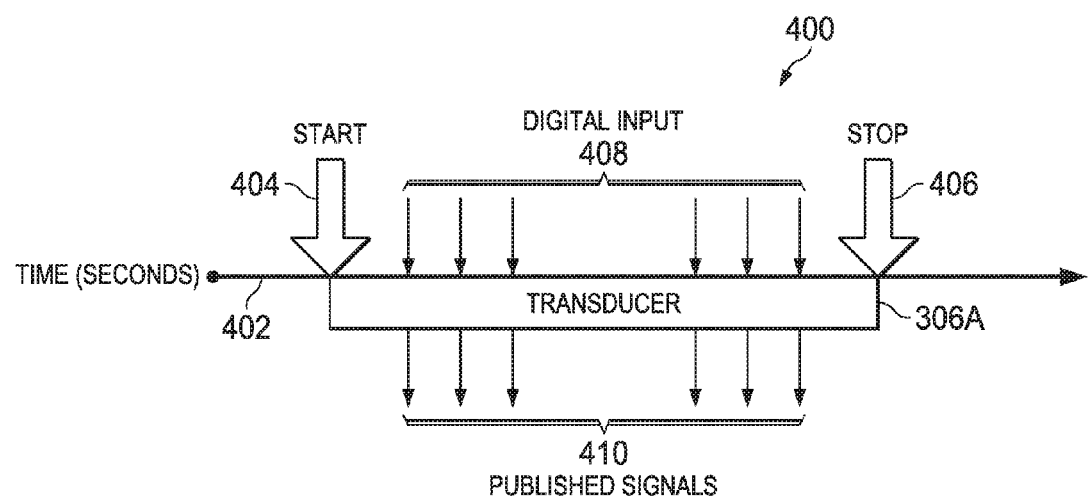
FIG. 4A is a diagram illustrating one embodiment of a transducer that may be used with the platform of FIG. 3.

With additional reference to FIG. 4A, one embodiment of the transducer 306a is illustrated in an environment 400 with a line 402 representing time. Like each transducer instance, the instance for the transducer 306a extends an abstract Transducer superclass. The subclass must then override the start and stop methods of the superclass.

The start method (represented by arrow 404) is executed when the transducer 306a is started through the REST API. The transducer 306a may also accept parameters through the API and configured through a front-end. The start method is responsible for executing whatever code is necessary for the function of the transducer 306a. Such functions may include, but are not limited to, digital-to-digital conversion (e.g., unit conversion), filtering (e.g., noise elimination), enrichment (e.g., adding attributes such as time and location), grouping/categorizing (e.g., ranking distributions), characterizing/descriptive statistics (e.g., frequency distribution), and transformation (e.g., Fourier transforms). One example of such functionality would be for the transducer 306a to start polling a Web API at an interval defined by an input parameter. The transducer 306a receives digital signal inputs 408.

Transducers may be viewed as independent threads that can be started or stopped via the API. As long as a transducer thread is running, it has the ability to publish signal objects 410 to a conduit asynchronously. If the transducer thread is not running, no processing occurs and no signals can be published from that transducer. Transducers do not deliver the published signal objects 410 as an output to the start method. Instead, the transducer should asynchronously publish its signal objects 410 to the respective conduit (described below) rather than return these signals as an output to the method. The stop method (represented by arrow 406) is executed when the transducer is stopped through the API. The stop method is responsible for cleaning up and closing down any requests that may have been opened by the start method. No output is expected from this method.

Figure 4B:
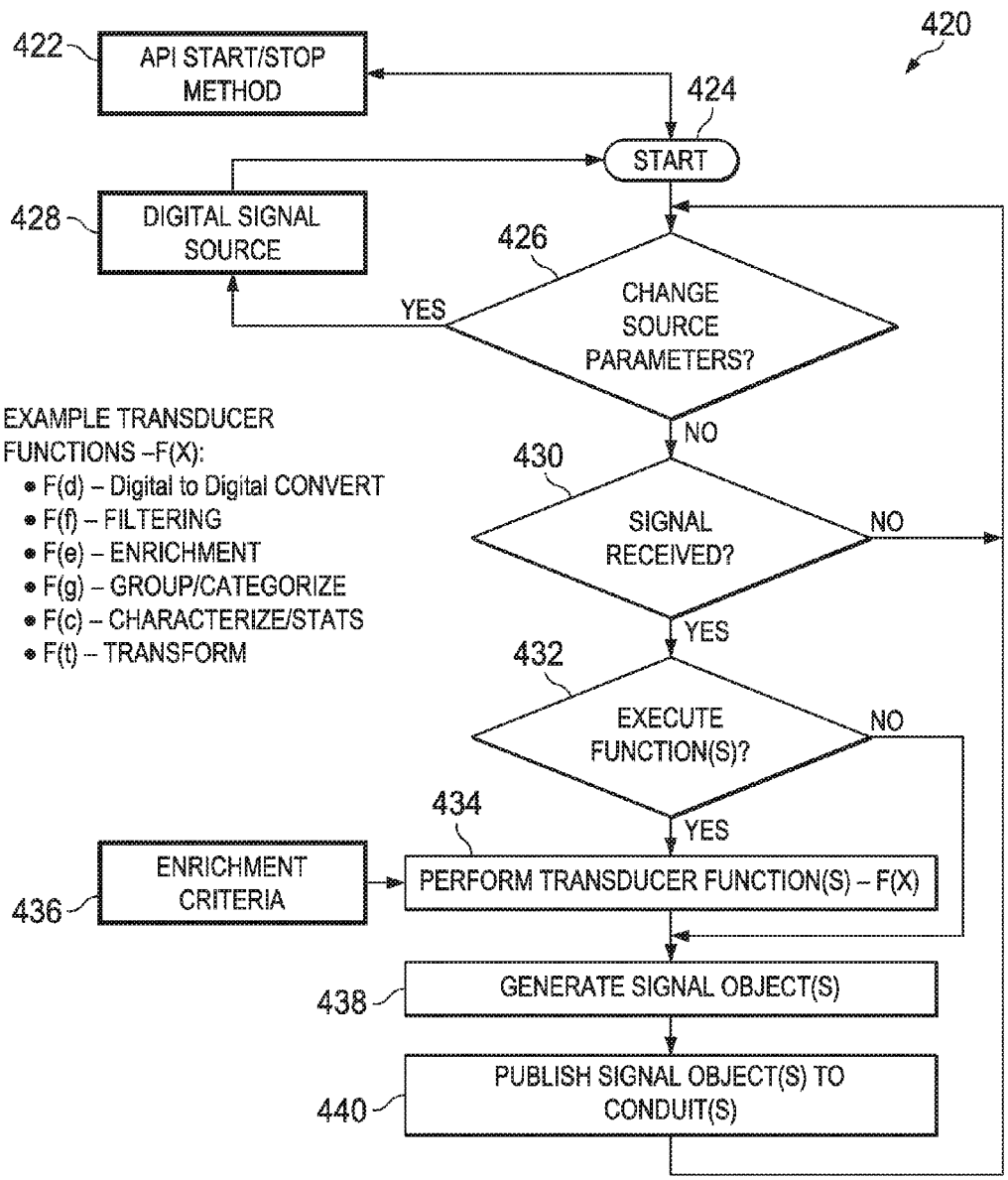
FIG. 4B is a flow chart illustrating one embodiment of a method that may be used with the transducer of FIG. 4B.

Referring to FIG. 4B, a method 420 illustrates one embodiment of a process that may be used with a transducer (e.g., the transducer 306a of FIG. 3). In step 422, an API stop/start method may be executed to start the transducer as illustrated by step 424. In step 426, a determination may be made as to whether any source parameters are to be changed. If source parameters are to be changed, the transducer may communicate with the digital signal source 428 before the method 420 returns to the start 424. If no source parameters are to be changed, the method 420 moves to step 430.

In step 430, a determination may be made as to whether a signal has been received. If no signal has been received, the method 420 returns to step 426. If a signal has been received, the method 420 continues to step 432, where a determination is made as to whether any functions are to be executed. If no functions are to be executed, the method 420 moves to step 438. If functions are to be executed, the method 420 continues to step 434 and executes the functions. As illustrated, possible functions F(x) include F(d) for digital to digital conversions, F(f) for adding dynamic context, F(e) for enrichment (e.g., using enrichment criteria 436), F(g) for grouping/categorizing, F(c) for characterizing/statistical functionality, and/or F(t) for transformations.

In step 438, the method 420 generates one or more signal objects based on the signals and the results of any functions that may have been executed in step 434. In step 440, the signal objects are published to one or more conduits of the conduit functionality block 204.

Returning again to FIG. 3, the conduit functionality block 204 includes one or more conduits 308a-308N, where N is the total number of conduits on the platform 102 (and may be different than the N of the transducers 306a-306N). The conduits 308a-308N may be managed by a management conduit 310. The management conduit 310 may allocate and de-allocate particular conduits 308a-308N based on whether a conduit has any subscribers and/or publishers. Generally, conduits are queues that are aware of who and/or what is publishing and subscribing to them. They may be dynamically allocated and de-allocated based on demand.

Using the conduit 308a as an example, the conduit 308a collect signal objects from publishers, which may be transducers, applications, and/or the API 208. The conduit 308a queues the signal objects if necessary and delivers the signal objects to any subscribers of the conduit 308a. If a publisher is publishing signals but there are no subscribers, the conduit 308a will immediately de-allocate the signal. If a subscriber is subscribed to the conduit 308a but there are no active publishers, the conduit 308a will remain closed and will not be allocated any processing power.

When the conduit 308a receives a signal from a publisher (e.g., the transducer 306a), conduit 308a proactively notifies and delivers this signal to any and all subscribers (e.g., application 312a). In this embodiment, subscribers do not need to "poll" the conduit 308a for signal objects as the signal objects will be delivered as soon as the subscriber is ready to receive them.

In addition to applications subscribing to conduits, a conduit API (e.g., the API 208) can also subscribe to one or more conduits. This allows other platform instances or external applications to subscribe to the conduit API 208 and essentially subscribe to a specific conduit within the platform 102. Similar to the subscription model, the conduit API 208 can also publish to one or more conduits. This allows other platform instances or external applications to deliver signal objects in the internal signal format to conduits within the platform 102. External applications can avoid the transducer functionality block 202 by delivering signal objects directly to the conduit API 208.

Figure 5:
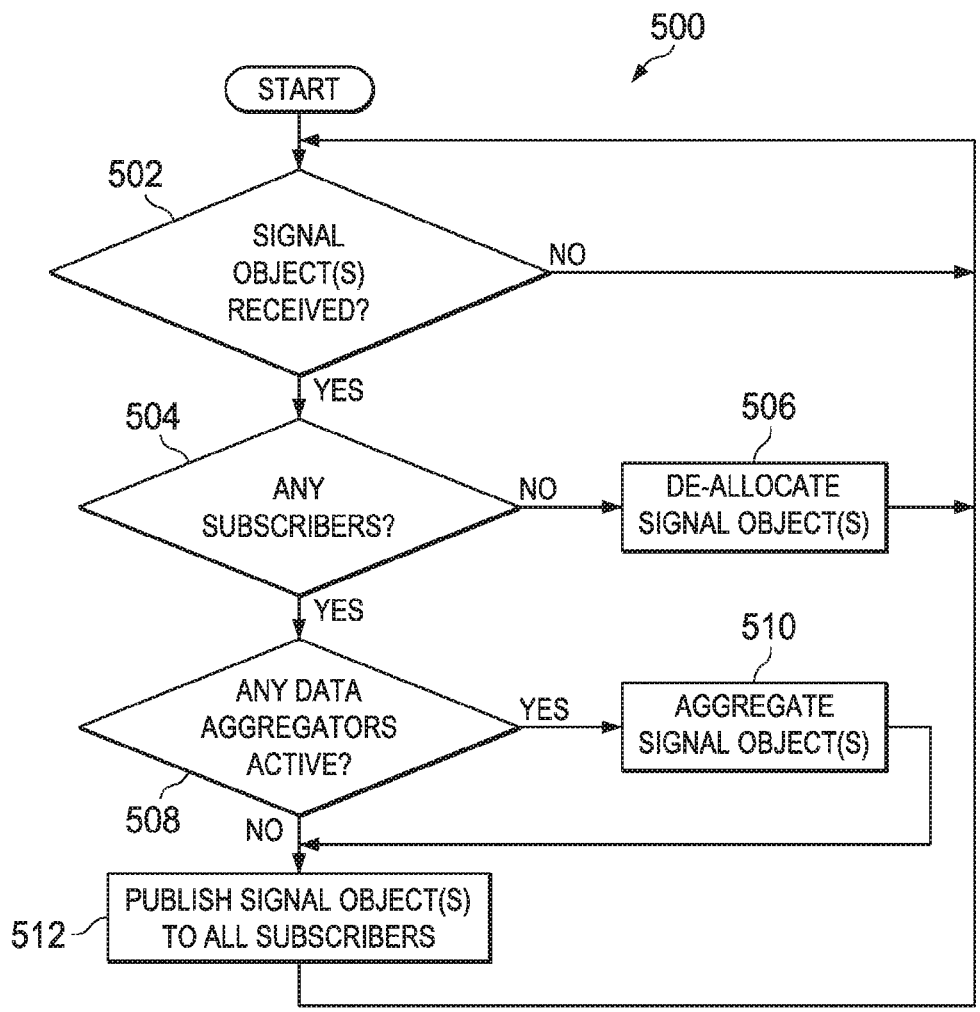
FIG. 5 is a flow chart illustrating one embodiment of a method that may be used for the dynamic allocation and de-allocation of conduits within the platform of FIG. 3.

With additional reference to FIG. 5, a method 500 illustrates one embodiment of a process by which a conduit (e.g., the conduit 308a of FIG. 3) may receive an input signal object and publish the signal object for use by the platform 102. In step 502, a determination may be made as to whether any signal objects have been received. If no signal objects have been received, the method 500 returns to step 502. If signal objects have been received, the method 500 continues to step 504, where a determination may be made as to whether there are any subscribers. If there are no subscribers, the method 500 may continue to step 506, where the received signal objects are de-allocated before the method 500 returns to step 502. If there are subscribers, the method 500 moves to step 508.

In step 508, a determination may be made as to whether any data aggregators are active. While an action may be configured to write data to a database (as illustrated shown by transducer 306c connected to network content 352), the platform 102 has the ability to optionally aggregate selected signal objects to a database. This ability illustrates the elective aspect of the platform's data aggregation. A data aggregator can be turned on or off via the same API that turns on applications or transducers (e.g., the REST API). A data aggregator can subscribe to one or more conduits and aggregate all signal objects that pass through the conduit. This ability, in combination with an application configured to filter out signal objects that are not needed, allows for complete selective data aggregation.

Accordingly, if one or more data aggregators are active as determined in step 508, the method 500 moves to step 510, where signal objects are aggregated. If there are no data aggregators active as determined in step 508 or after the signal objects are aggregated in step 510, the method 500 moves to step 512. In step 512, the signal objects are published to all subscribers of the conduit before the method 500 returns to step 502.

Referring again to FIG. 3, one embodiment of the application functionality block 206 includes one or more applications 312a-312N, where N is the total number of applications on the platform 102. Each application 312a-312N may include one or more of a pre-adapter functionality block 314, a dynamic context functionality block 316, a post-adapter functionality block 318, and an action functionality block 320. The pre-adapter functionality block 314, dynamic context functionality block 316, post-adapter functionality block 318, and action functionality block 320 may be configured separately for each application 312a-312N. Accordingly, each application 312a-312N may be configured independently of the other applications and may provide completely different functionality even though the underlying architecture of each application 312a-312N is the same as that of the other applications. Furthermore, one application 312a-312N may produce output that is compatible with the underlying architecture and that output may be consumed by another application 312a-312N, thereby enabling the platform 102 to provide highly complex functionality by linking multiple applications together and independently configuring them to provide a particular part of the functionality.

As stated above, an application 312a-312N is a collection of one or more pre-adapters, dynamic context blocks, post-adapters, and actions. It is noted pre-adapters and post-adapters are the same except that pre-adapters are executed before the dynamic context block and post-adapters are executed after the dynamic context block.

Applications can be configured through the Application Configuration API 206. This is where the collection of items is defined (e.g., the pre-adapters, dynamic context blocks, post-adapters, and actions that are to be used with the application), as well as parameters and options for each item.

Through the Application Configuration API 206, a user can specify which conduits the application should subscribe to. The platform 102 also has the ability to automatically subscribe to relevant conduits if needed. The platform 102 does this by detecting which signal objects are relevant to the application and then subscribing to all conduits that deliver signals of the same type. The Application Configuration API 206 also allows for the configuration of output conduits. After an application is done processing a signal object, it can publish that signal back into another conduit. If no output conduits are defined, the signal object gets de-allocated by the application once processing is complete.

Applications are started and stopped via an API in manner that is similar to the way transducers are started and stopped. When an application is started, all of the relevant application components are also started. When an application is stopped, the components are all stopped if no other applications are running and using the same component.

Figure 6A:
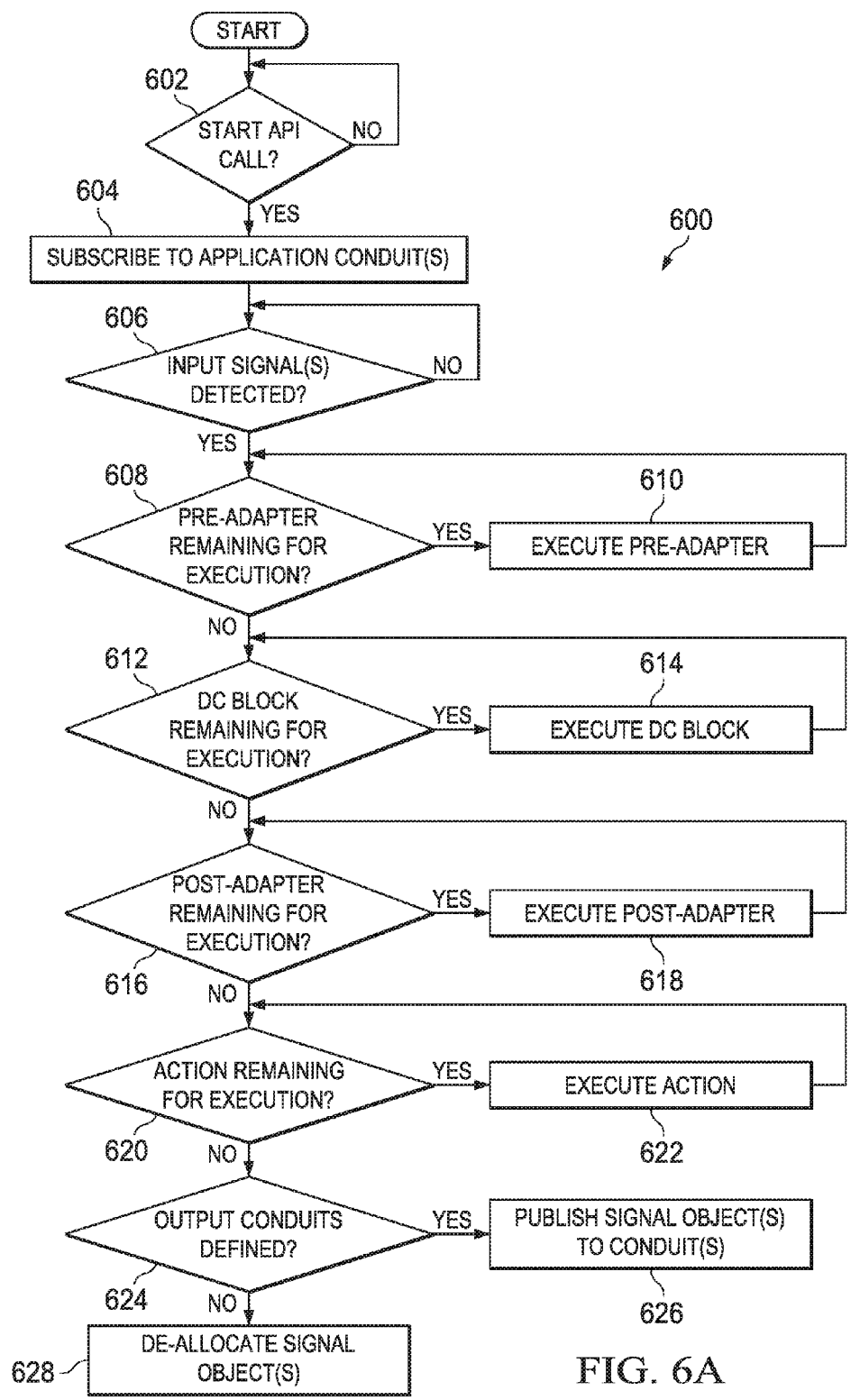
FIGS. 6A and 6B are flow charts illustrating embodiments of methods that may be used with the platform of FIG. 3.

With additional reference to FIG. 6A, a method 600 illustrates one embodiment of a process by which an application (e.g., the application 312a) may receive one or more signal objects and handle them as configured. More specific example of pre-adapters, dynamic context blocks, post-adapters, and actions will be described in later embodiments in greater detail, but the method 600 illustrates how the various components may be executed by an application.

In step 602, a determination may be made as to whether a call to start the API has been received. If no call has been received, the method 600 returns to step 602. If a call has been received to start the API, the method 600 moves to step 604. In step 604, the application subscribes to one or more conduits. In step 606, a determination may be made as to whether any input signals (e.g., signal objects) have been detected. If no input signals have been detected, the method 600 may repeat step 606 until an input signal is detected. If an input signal is detected, the method 600 moves to step 608.

In step 608, a determination may be made as to whether a pre-adapter is to be executed. If a pre-adapter is to be executed, the method 600 moves to step 610, where the pre-adapter is executed. The method 600 then returns to step 608 and the determination is again made as to whether another pre-adapter is to be executed. Steps 608 and 610 may repeat until all pre-adapters have been executed. If there are no pre-adapters to execute, the method 600 moves to step 612.

In step 612, a determination may be made as to whether a dynamic context block is to be executed. If a dynamic context block is to be executed, the method 600 moves to step 614, where the dynamic context block is executed. The method 600 then returns to step 612 and the determination is again made as to whether another dynamic context block is to be executed. Steps 612 and 614 may repeat until all dynamic context blocks have been executed. If there are no dynamic context blocks to execute, the method 600 moves to step 616.

In step 616, a determination may be made as to whether a post-adapter is to be executed. If a post-adapter is to be executed, the method 600 moves to step 618, where the post-adapter is executed. The method 600 then returns to step 616 and the determination is again made as to whether another post-adapter is to be executed. Steps 616 and 618 may repeat until all post-adapters have been executed. If there are no post-adapters to execute, the method 600 moves to step 620.

In step 620, a determination may be made as to whether an action is to be executed. If an action is to be executed, the method 600 moves to step 622, where the action is executed. The method 600 then returns to step 620 and the determination is again made as to whether another action is to be executed. Steps 616 and 618 may repeat until all actions have been executed. If there are no actions to execute, the method 600 moves to step 624.

In step 624, a determination may be made as to whether any output conduits have been defined. If one or more output conduits have been defined, the method 600 moves to step 626 and publishes the signal objects to the conduit. If no conduits have been defined, the method 600 moves to step 628 and de-allocates the signal objects.

Referring again to FIG. 3, the pre-adapter functionality block 314 includes one or more pre-adapters 322a-322N and post-adapter functionality block 318 includes one or more post-adapters 324a-324N, where N is the total number of pre-adapters and post-adapters on the platform 102. It is understood that N need not have the same value for pre-adapter functionality block 314 and post-adapter functionality block 318.

Each pre-adapter 322a-322N and post-adapter 324a-324N is a script that may be configured via code and may be executed before or after a dynamic context block of the dynamic context functionality block 316. The input to an adapter is a group of signal objects (e.g., one or more) and the output is also a group of signal objects. Adapters are intended to add dynamic context (F(f)) to signal objects or enrich (F(e)) signal objects in a more customized fashion than is enabled by the dynamic context blocks of the dynamic context functionality block 316. Adapters may vary in complexity, with a trivial adapter simply returning its input signal objects as output, but where no dynamic context is added or enrichment is performed.

Adapters may also generate new signal objects and append them to the list of input signal objects to return. Because they are configured via code, adapters can reference external sources and make decisions based on a state that does not reside within the platform 102. By allowing adapters to be executed before or after the signal objects reach the dynamic context functionality block 316, the platform 102 is able to perform custom processing before or after a dynamic context block determines which signal objects are important to an application. Adapters may receive additional optional parameters that can be configured via a front-end and delivered via the application API 206.

Figure 6B:
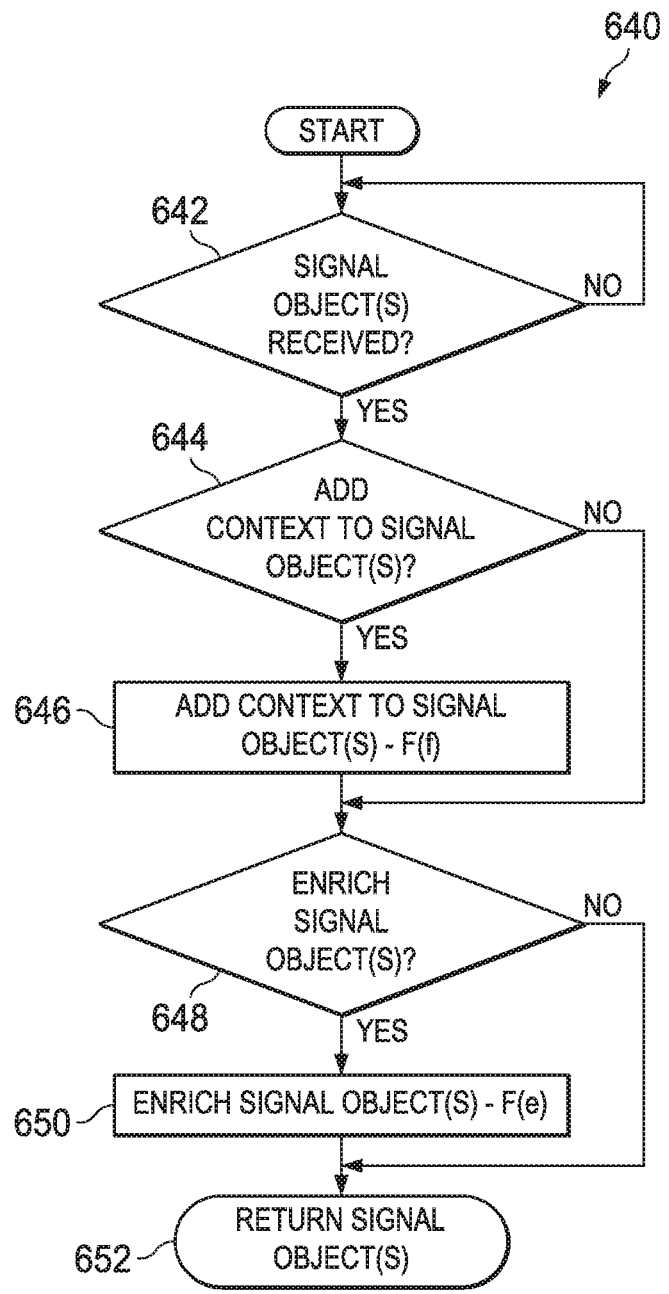

With additional reference to FIG. 6B, a method 640 illustrates one embodiment of a process by which a pre-adapter 322a-322N and/or a post-adapter 324a-324N may receive one or more signal objects, handle them, and provide an output. In step 642, a determination may be made as to whether there are any signal objects. If there are no signal objects, the method 640 returns to step 642. If there are signal objects, the method 640 continues to step 644, where a determination may be made as to whether any of the signal objects are to have dynamic context added. If dynamic context is to be added, the dynamic context is added in step 646 before the method 640 continues to step 648. If no dynamic context is to be added, the method 640 moves to step 648 from step 644. In step 648, a determination may be made as to whether any of the signal objects are to be enriched. If enrichment is to occur, the enrichment is performed in step 650 before the method 640 continues to step 652. If no enrichment is to be performed, the method 640 moves to step 652 from step 648. In step 652, the signal objects are returned.

Referring again to FIG. 3, the dynamic context functionality block 316 includes various dynamic context blocks that provide configurable intervals that group a subset of signal objects based on one or more properties in the signal. The groups may be based on relationships in time, space, and/or state via a configurable front-end. In some embodiments, the dynamic context blocks may partition multiple signal objects over an interval (e.g., a period of time) and deliver the entire group of partitioned signal objects at once based on an interval termination condition. In other embodiments, the partitioned signal objects may be delivered dynamically as they are partitioned (e.g., in an "as received" mode).

The dynamic context functionality block 316 may perform signal object grouping based on time using a time based dynamic context functionality block 326, space using a space based dynamic context functionality block 328, state using a state based dynamic context functionality block 330, and branch functionality block 332. The branch functionality block 332 does not add dynamic context, but has the ability to distribute signal objects to different conduits based on a configurable condition. For example, an application may be configured to listen to RFID signals from two portals, but all tag read signal objects from one portal are supposed to go to one conduit and all tag read signal objects from the other portal are supposed to go to another conduit. Using the branch functionality block 332, conditions may be specified for where each signal object should be routed. In addition to adding dynamic context using a single layer (e.g., only time, space, or state), a composite functionality block 334 may be used to provide for the addition of composite dynamic content that enables signal objects to be grouped using two or more of time/space/state.

The time based dynamic context functionality block 326 may add dynamic context using signal object interval (SOI) functionality 336, sliding signal object interval (SSOI) functionality 338, fixed interval (FI) functionality 340, and/or sliding fixed interval (SFI) functionality 342. For purposes of illustration, a signal object interval may be a context window that opens and terminates based on a signal object condition. A sliding signal object interval may be a sliding context window that opens based on a signal object and remains open for a specified number of signal objects. A fixed interval may be a context window that is only open at a fixed time interval (e.g., 3 PM to 5 PM). A sliding fixed interval may be a context window that opens based on a signal object and remains open for a specified period of time.

Because signal objects are delivered to the dynamic context blocks asynchronously, the dynamic context blocks 326, 328, and 330 are generally configured to remain open and maintain their knowledge of the signal after delivery. For example, a dynamic context block may maintain awareness of its signal objects for the window (whether stored in memory or to disk) until the window/dynamic context block is closed/terminated. This allows for multiple signal objects to be compared to each other in a dynamic context block without ensuring that the signal objects arrive at the exact same moment.

Figure 6C:
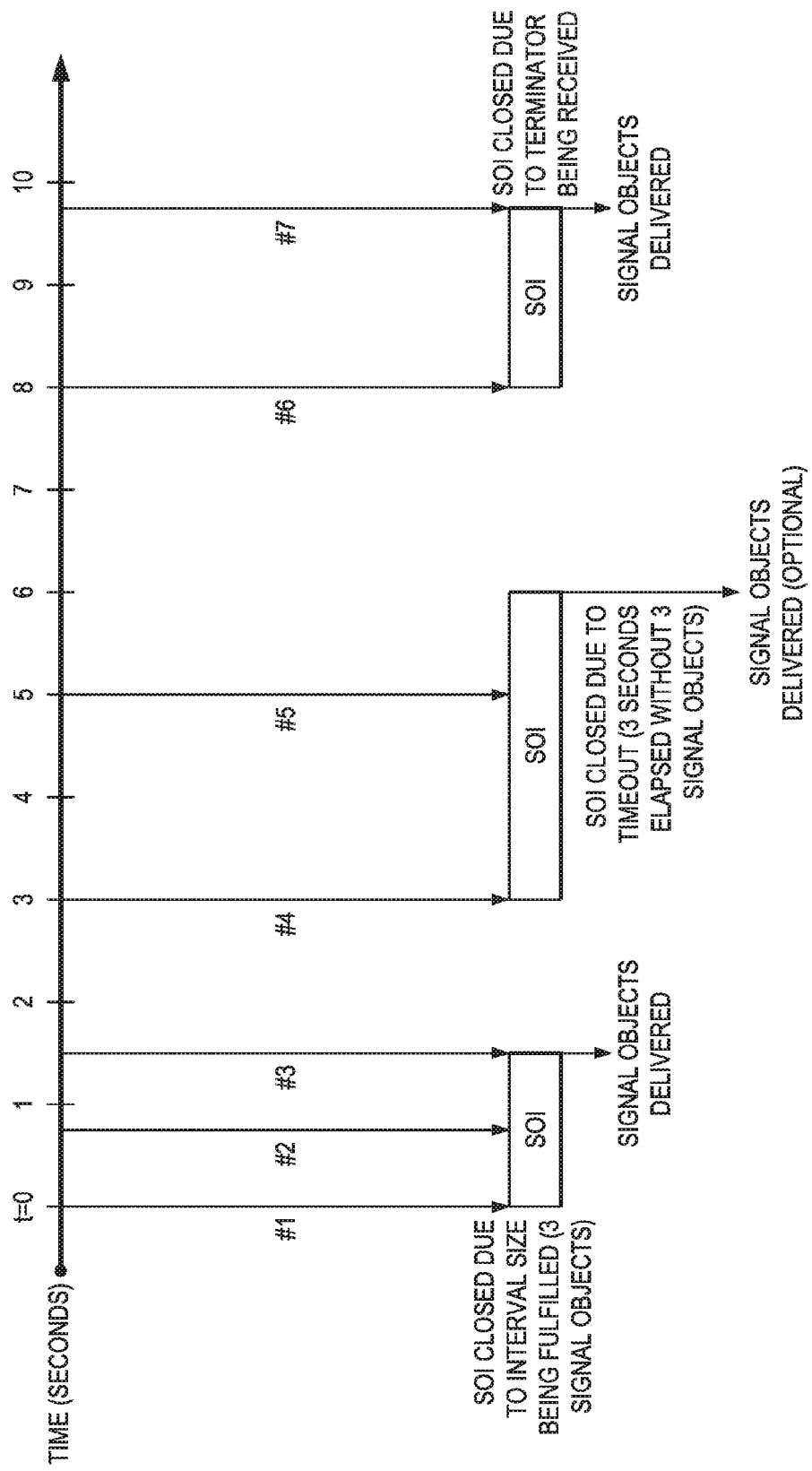

With additional reference to FIG. 6C, one embodiment of a signal object interval specification is provided for a signal object interval with an interval size of three signal objects and a timeout of three second. In the present example, a signal object interval must have at least one of the following termination conditions: interval size (in number of signal objects), terminator signal object condition, and/or expiration timeout (in seconds). Signal objects #1-#3 result in closure of the SOI due to the interval size being fulfilled (e.g., three signal objects). Signal objects #4 and #5 result in closure of the SOI due to timeout (e.g., three second elapsed without three signal objects). Signal objects #6 and #7 result in closure of the SOI due to a terminator signal object being received. In each case, the signal objects may be delivered.

With additional reference to FIG. 6D, one embodiment of a fixed signal object interval specification is provided for an interval that is open between 9:00 AM and 11:00 AM. Signal objects #1 and #2 are not delivered as they are received before the FI is opened. Signal objects #3 and #4 are delivered as they are received while the FI is open. Signal objects #5 and #6 are not delivered as they are received after the FI is closed.

Figure 7A:
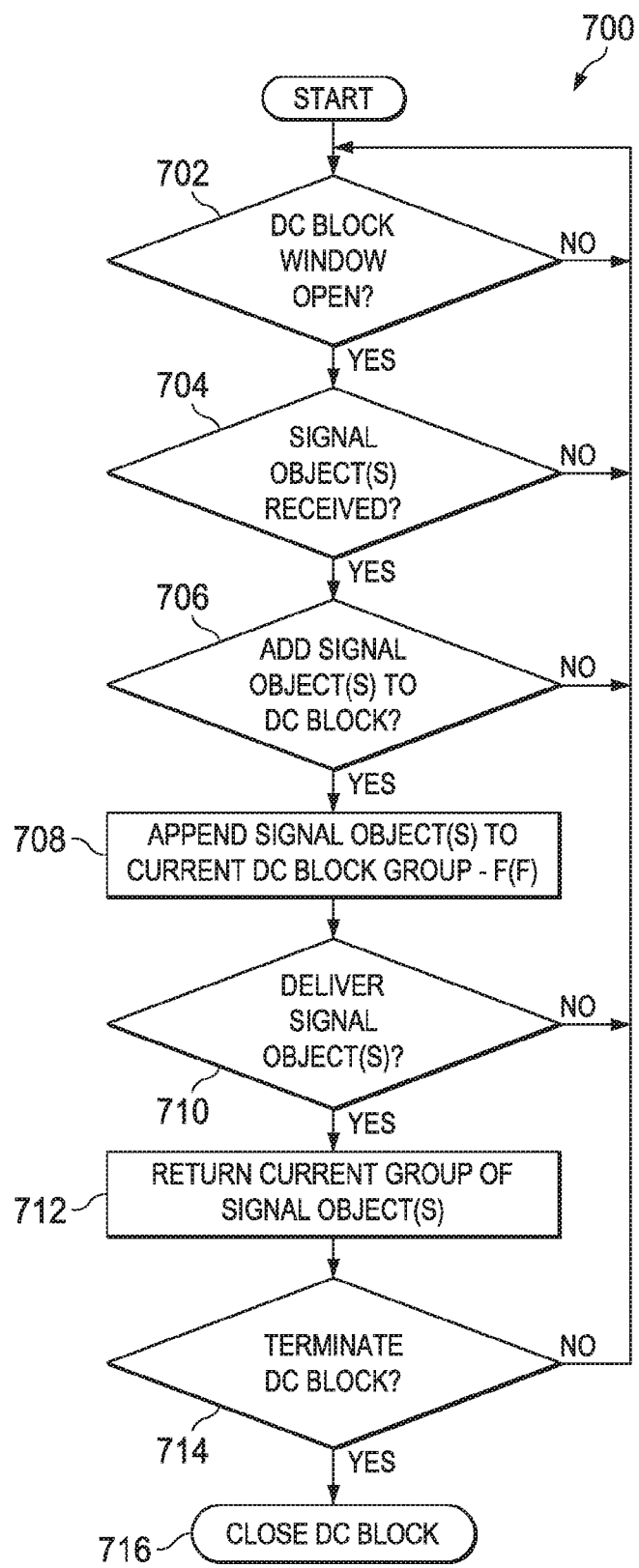
FIGS. 7A and 7B are flow charts illustrating embodiments of methods that may be used with the platform of FIG. 3.

With additional reference to FIG. 7A, a method 700 illustrates one embodiment of a process by which a dynamic context block may receive one or more signal objects, perform grouping, and provide an output. In step 702, a determination may be made as to whether the dynamic context block window is open. If the dynamic context block window is not open, the method 700 returns to step 702. If the dynamic context block window is open, the method 700 continues to step 704.

In step 704, a determination may be made as to whether any signal objects have been received. If no signal objects have been received, the method 700 returns to step 702. If signal objects have been received, the method 700 continues to step 706. In step 706, a determination may be made as to whether the signal objects should be added to the dynamic context block. If the signal objects should not be added to the dynamic context block, the method 700 returns to step 702. If the signal objects are to be added to the dynamic context block, the method 700 continues to step 708. In step 708, the signal objects are appended to the current dynamic context block group. The method 700 then continues to step 710.

In step 710, a determination may be made as to whether the signal objects are to be delivered. If no signal objects are to be delivered, the method 700 returns to step 702. If the signal objects are to be delivered, the method 700 continues to step 712. In step 712, the current group of signal objects is returned. The method 700 then continues to step 714. In step 714, a determination may be made as to whether the dynamic context block is to be terminated. If the dynamic context block is not to be terminated, the method 700 returns to step 702. If the dynamic context block is to be terminated, the method 700 moves to step 716 where the dynamic context block is closed.

Referring again to FIG. 3, the action functionality block 320 may include an internal action functionality block 344 providing internal actions 348*a*-348N and an external action functionality block 346 providing external actions 350*a*-350N. It is understood that N need not have the same value for internal actions 344*a*-344N and external actions 346*a*-346N.

Actions are configurable communications that can be made at the end of an application's processing cycle for a signal object or a group of signal objects. An application can have more than one type of action. Internal actions 344a-344N are actions that only control components within the platform 102 (e.g., turning on/off an application/transducer or changing an application's properties). External actions 346a-346N are actions that interact with something outside of the platform 102, either through the use of a transducer 306a-306N or the API 208 that in turn performs some action on an external resource (e.g., send an email or start a motor).

Action commands are delivered asynchronously via an API (e.g., a REST API) style architecture API). In the case of an external action and transducer, it is up to the transducer to properly process the API command from the action and deliver the proper message to the network content to which the transducer connects.

Each action is mapped to a specific signal object type. Therefore, an application could process two different signal object types and have two corresponding actions. If only one of the signal object types was passed to the action, then only the action associated with that signal object type would be executed. Additionally, this allows actions to deliver properties of the respective signal object in the API command. For example, an action that sends an email could include one or more properties of the signal object in the body of the email.

Figure 7B:
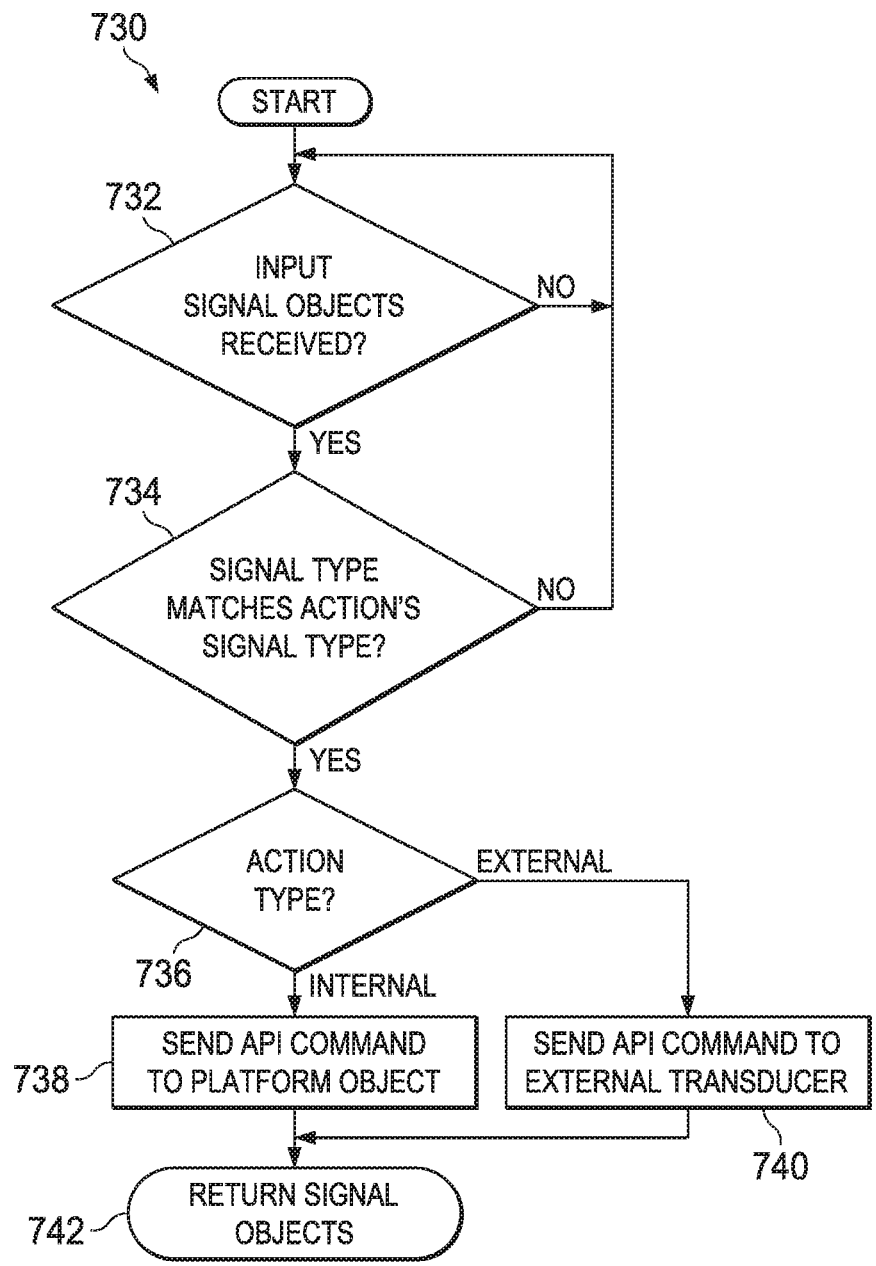

With additional reference to FIG. 7B, a method 730 illustrates one embodiment of a process by which the action functionality block 320 may receive one or more signal objects and determine whether to perform one or more actions based on the received signal objects. In step 732, a determination may be made as to whether any signal objects have been received. If no signal objects have been received, the method 730 returns to step 732. If signal objects have been received, the method 730 continues to step 734. In step 734, a determination may be made as to whether the signal type of the received signal objects matches an action's signal type. If no signal object has a signal type that matches an action's signal type, the method 730 returns to step 732. If there is a match, the method 730 continues to step 736.

In step 736, a determination may be made as to whether the action type is an internal action (e.g., one of the internal actions 344a-344N) or an external action (e.g., one of the external actions 346a-346N). If the signal type is an internal action, the method 730 moves to step 738, where an API command is sent to a platform object. If the signal type is an external action, the method 730 moves to step 740, where an API command is sent to an external transducer. Once the action is executed (whether step 738 or step 740), the method 730 moves to step 742, where the signal objects are returned.

The API functionality block 208 may include various APIs such as a conduit API, a REST API, and/or other APIs (e.g., standard web services, RESTful Messaging Service (RESTMS), Simple Object Access Protocol (SOAP), and/or Atom Publishing Protocol (AtomPUB)). The function of such APIs will be described in greater detail in various examples.

In the present example, the external source/destination 104 of FIG. 1A is represented by network content 352, a database 354, a device/network/server/cloud 356, an application server 358, a user interface (UI) 360, and a console 362.

The application server 358 may be used to remotely store optional functionality of the platform 102. For example, the application server 358 may store libraries, modules, and/or entire applications that may be accessed by the platform 102 when needed. In some embodiments, the functionality may be retrieved and incorporated directly into the platform itself (e.g., downloaded from the application server 358 and stored on the platform 102). In other embodiments, the functionality may be remain on the application server 358 and the platform 102 may access the functionality when needed (e.g., make a call to a library stored on the application server 358 without downloading and storing the library on the platform 102).

Figure 7C:
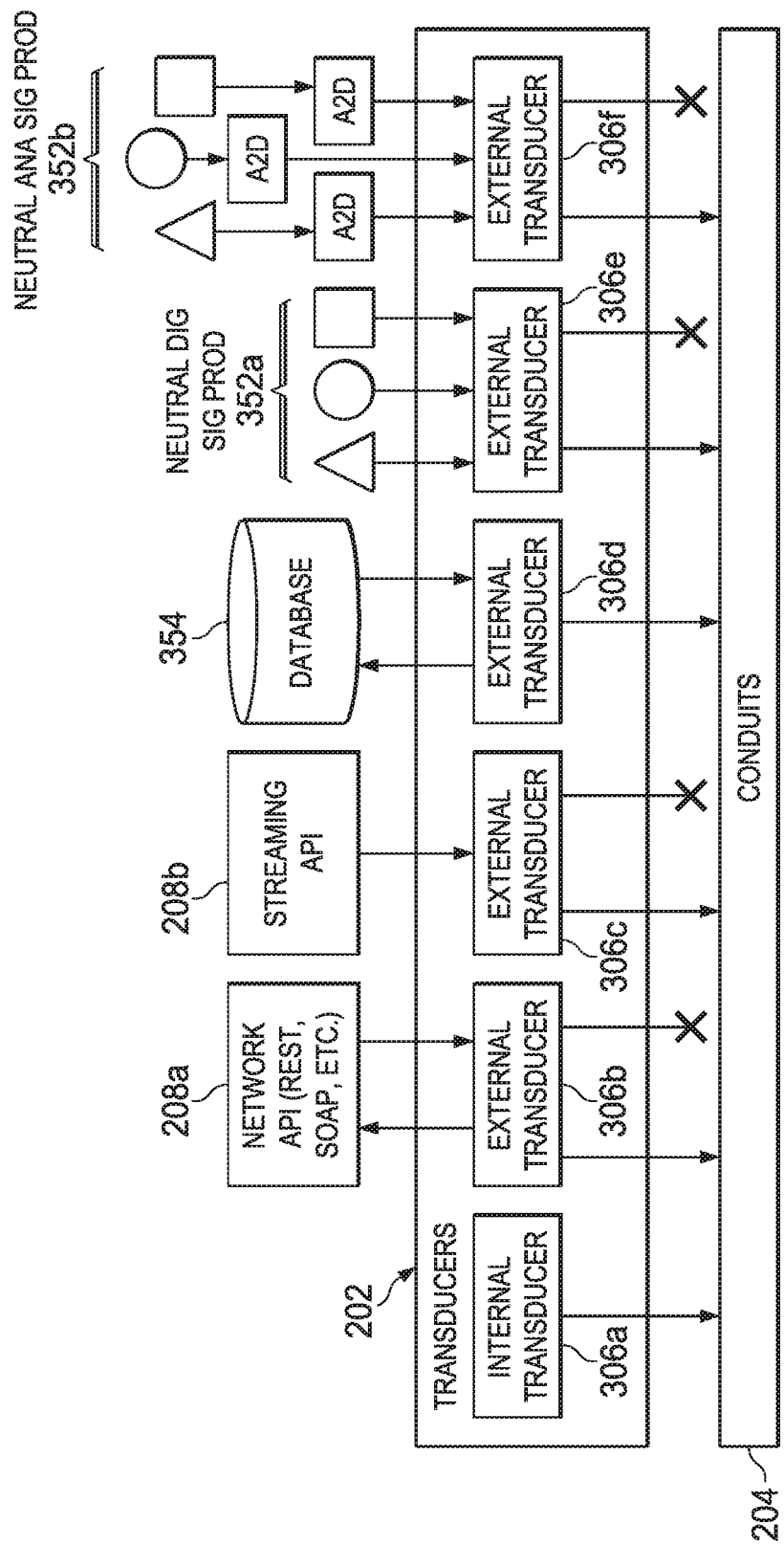
FIG. 7C is a diagram of one embodiment of a portion of the platform of FIG. 3 illustrating communication between conduits, transducers, APIs, and external network content.

Referring to FIG. 7C, one embodiment of a portion of the platform 102 of FIG. 3 is illustrated. As shown, transducers 202 may be divided into internal transducer 306a and external transducers 306b-306f. The external transducers 306b-306f form an interface between the conduits 204 and other components of the platform 102, such as network API 208a and streaming API 208b. The external transducers 306b-306f also form an interface between the conduits 204 and external entities, such as database 354, neutral digital signal producers 352a, and neutral analog signal producers 352b, which may communicate with the external transducer 306f via analog to digitals converters.

Figure 7D:
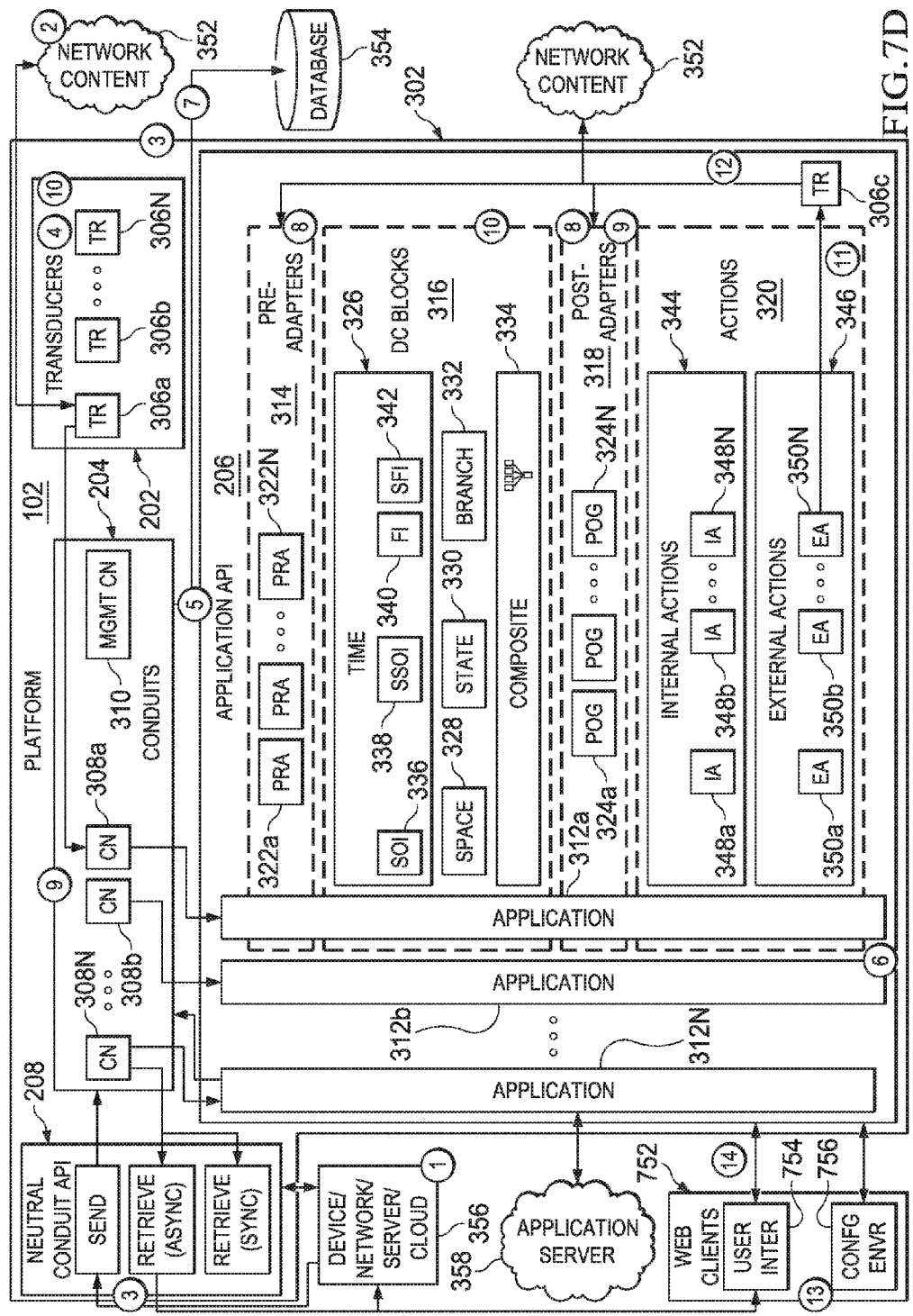
FIG. 7D is a diagram of one embodiment of the platform of FIG. 3 illustrating components that may be configured during installation and/or configuration.

Referring to FIG. 7D, one embodiment of the platform 102 of FIG. 3 is illustrated coupled to web clients 752 that provide user interaction functionality 754 and configuration environment functionality 756. The present example is directed to installation and configuration of the platform 102 (items 1-5), applications (items 6-12), and an optional user interface (UI) via a web browser (items 13 and 14). For purposes of convenience, each item of the present example is represented in FIG. 7D by a number in a circle.

Platform installation and configuration may include the following. As indicated by item 1, an application host is selected for the platform 102. The application host may be a device, network, server, cloud, or hybrid host architecture. The platform 102 is installed onto the host. As the platform 102 is neutral to the host OS, the platform 102 may be installed on many different OS configurations. Installation may include downloading set-up tools and performing minor configuration adjustments to establish a runtime environment. As indicated by item 2, a source or sources of input may be determined. The sources may include local host system inputs (from available elements), sensors, web content (web feeds, data feeds, video, voice, RSS, API to API), and/or any other type of input.

As indicated by item 3, requirements for connectivity to the source are determined and the platform 102 is configured based on the requirements. The configuration may occur in various ways, such as using a platform API or a custom transducer for the specific source. As indicated by item 4, a determination may be made as to whether source content and operating objectives require custom elements within a transducer. As indicated by item 5, selective data archive preferences may be established and any needed connectivity may be established.

The platform 102 provides a high level of configurability of custom applications from a configuration console within the platform 102. Application configuration may include the following. As indicated by item 6, from the console, application objectives and requirements (e.g., source, objective, audience, level of dynamic context addition/enrichment, and actions) may be determined. As indicated by item 7, data archive requirements and parameters (optional) may be determined. As indicated by item 8, a determination may be made as to whether source content refinement adapters are applicable (optional). If yes, a selection may be made from pre-built and/or custom built adapters to align with the application objective.

As indicated by item 9, the conduit manager 310 may be configured (with additional conduits configuring dynamically). As indicated by item 10, applicable application context (e.g., temporal, state, spatial) may be determined if needed. As indicated by item 11, requirements for Actions within an application (e.g., read, write, locate, notify, search, enrich, and/or count) may be determined. As indicated by item 12, a determination may be made as to whether bi-directional Action is applicable. If yes, an external transducer may be configured to return a message to the source.

The UI via a web browser may be provided as the platform 102 may be configured to run headless. The UI may be integrated with an existing user interface tool or a custom user interface. As indicated by item 13, UI objectives and requirements may be determined. As indicated by item 14, publishing to the UI may occur via a REST API interface.

Figure 8:
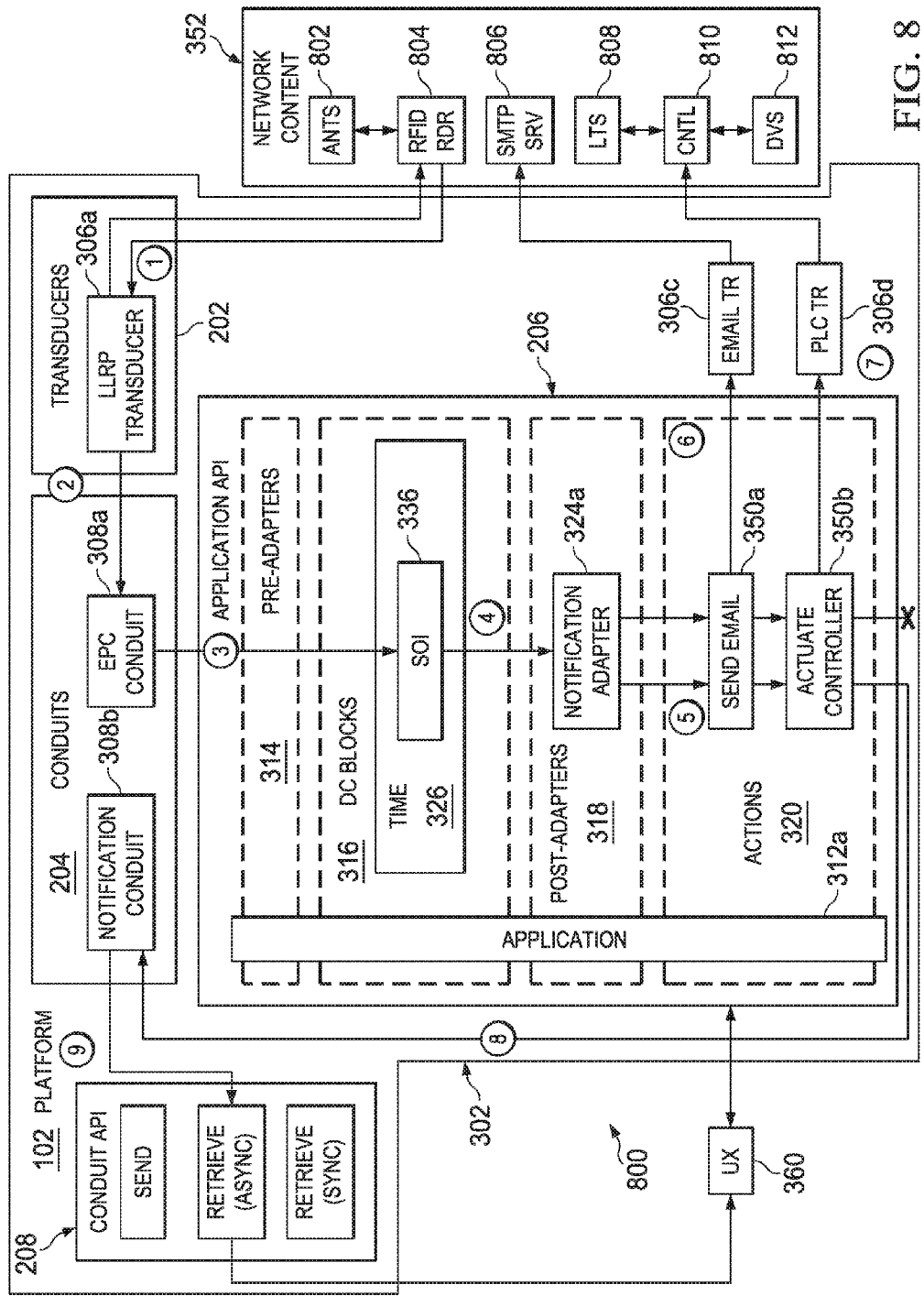
FIG. 8 is a diagram of one embodiment of the platform of FIG. 3 configured for an RFID environment.

Referring to FIG. 8, one embodiment of environment 800 illustrates a specific application of the platform 102 of FIG. 3. In the present example, the platform 102 is to find one unique Electronic Product Code (EPC) (a trademark of EPCglobal Inc. of Lawrenceville, N.J.) tag in a population of other unique tags. The tags are network content 352 from an RFID reader 804 that is coupled to antennas 802. The network content 352 also includes an SMTP server 806 and a controller 810 coupled to lights 808 and other devices 812. For purposes of example, RFID tags are receiving and transmitting within an RFID reader/antenna configuration provided by the RFID reader 804 and antennas 802. In the environment 800, the platform 102 is to detect one specific tag out of a tag population of n (where n=1-10,000) and process the tag to deliver the specified responses of digital control actuation (e.g., for a 110 volt appliance), e-mail actuation, and user interface notification. It is understood that the range of 1-10,000 is for purposes of example only and is not intended to be limiting.

The platform 102 is configured with a Low Level Reader Protocol (LLRP) transducer 306*a*, an email transducer 306*c*, a programmable logic controller (PLC) transducer 306*d*, an EPC conduit 308*a*, a notification conduit 308*b*, a time based SOI dynamic context block 336, a notification post-adapter 324*a*, a send email action 350*a*, an actuate controller action 350*b*, and a conduit API 208 with options for send signal object, retrieve signal object (asynchronously), and retrieve signal object (synchronously). It is understood that all of the functionality of the platform 102 shown in FIG. 3 may be present in FIG. 8, but may be unused. In other embodiments, the platform 102 of FIG. 8 may be a stripped down version of the platform 102 of FIG. 3, with some or all of the unused functionality removed entirely.

For purposes of convenience, each item of the present example is represented in FIG. 8 by a number in a circle. As indicated by item 1, a "handshake" occurs between the LLRP transducer 306*a* and the RFID reader 804. The RFID reader 804 converts the RF signals read by the antennas 802 into a digital signal understood by the LLRP transducer 306. The LLRP transducer 306 kicks off the "handshake" by providing a read cycle length and requesting that the RFID reader 804 send its tags. The RFID reader 804 then acknowledges the request and sends a "bundle of tags" that have been read to the LLRP transducer 306 once per the specified read cycle.

As indicated by item 2, whenever the LLRP transducer 306 receives a "bundle of tags" from the RFID reader 804, the LLRP transducer 306 converts those tags into individual RFIDTagSignalObjects. This is an example of a dynamic new signal object. Each tag read has one signal object. These signal objects are published into the EPC conduit 308*a* for use by applications.

As indicated by item 3, the application 312*a* is configured to listen to the EPC conduit 308*a* from which the RFID-SignalObjects will be read. No pre-adapter functionality 314 is needed for this application. The application 312*a* has an SOI dynamic context block 336 configured with an interval size of one signal object. Only tags with the specified TagID are passed on by the SOI dynamic context block 336. Accordingly, RFIDTagSignalObjects with TagIDs that do not match the specified TagID are dynamically de-allocated at this step and do not get past the SOI dynamic context block 336.

As indicated by item 4, signal objects that pass through the SOI dynamic context block 336 are indications that the specified TagID has been detected by the RFID reader 804. The application 312*a* has been configured to send a notification when the TagID has been read. To do so, the corresponding RFIDTagSignalObject is passed to the notification post-adapter 324*a*.

As indicated by item 5, the notification post-adapter 324*a* receives an RFIDTagSignalObject and produces an additional signal object called a NotificationSignalObject. This is an example of an adapter creating a dynamic new signal object. Both the original RFIDTagSignalObject and the newly created NotificationSignalObject are passed to the action functionality block 320 for the application 312*a*.

As indicated by item 6, the send email action 350*a* has been configured to communicate with the email transducer 306*c*. When the action receives an RFIDTagSignalObject, send email action 350*a* sends along the desired email information to the email transducer 306*c*. The email transducer 306*c* then communicates with the external SMTP server 806 to send the email asynchronously.

As indicated by item 7, the actuate controller action 350*b* is configured to communicate with the PLC Transducer. When the actuate controller action 350*b* receives an RFID-TagSignalObject, actuate controller action 350*b* communicates the desired action to the PLC transducer 306*d*. In this example, the desired action for the PLC transducer 306*d* is to turn on a light 808. The PLC transducer 306*d* then translates this desired action into a binary sequence that is understood by the controller 810. When the PLC transducer 306*d* sends this message to the controller 810, the controller 810 can determine the proper way to turn on the desired light (e.g., by activating a relay).

As indicated by item 8, the application 312*a* has been configured to use output conduits. Specifically, any NotificationSignalObject that is generated is to be published to the notification conduit 308*b* and any RFIDTagSignalObject that is generated will be dropped. By publishing signal objects to conduits from applications, any newly created signal objects may be processed by other applications.

As indicated by item 9, the conduit API 208 has been configured to subscribe to the notification conduit 308*b*. Accordingly, whenever a NotificationSignalObject is received on this conduit, any subscribers to the conduit API 208 will be delivered this signal object asynchronously. In this example, the UI 360 has subscribed to the conduit API 208 and wishes to be notified whenever a NotificationSignalObject has been received. Accordingly, the conduit API 208 will publish this signal object to the subscriber, and the UI 360 can take appropriate action (e.g., show a popup to the user).

Figure 9:
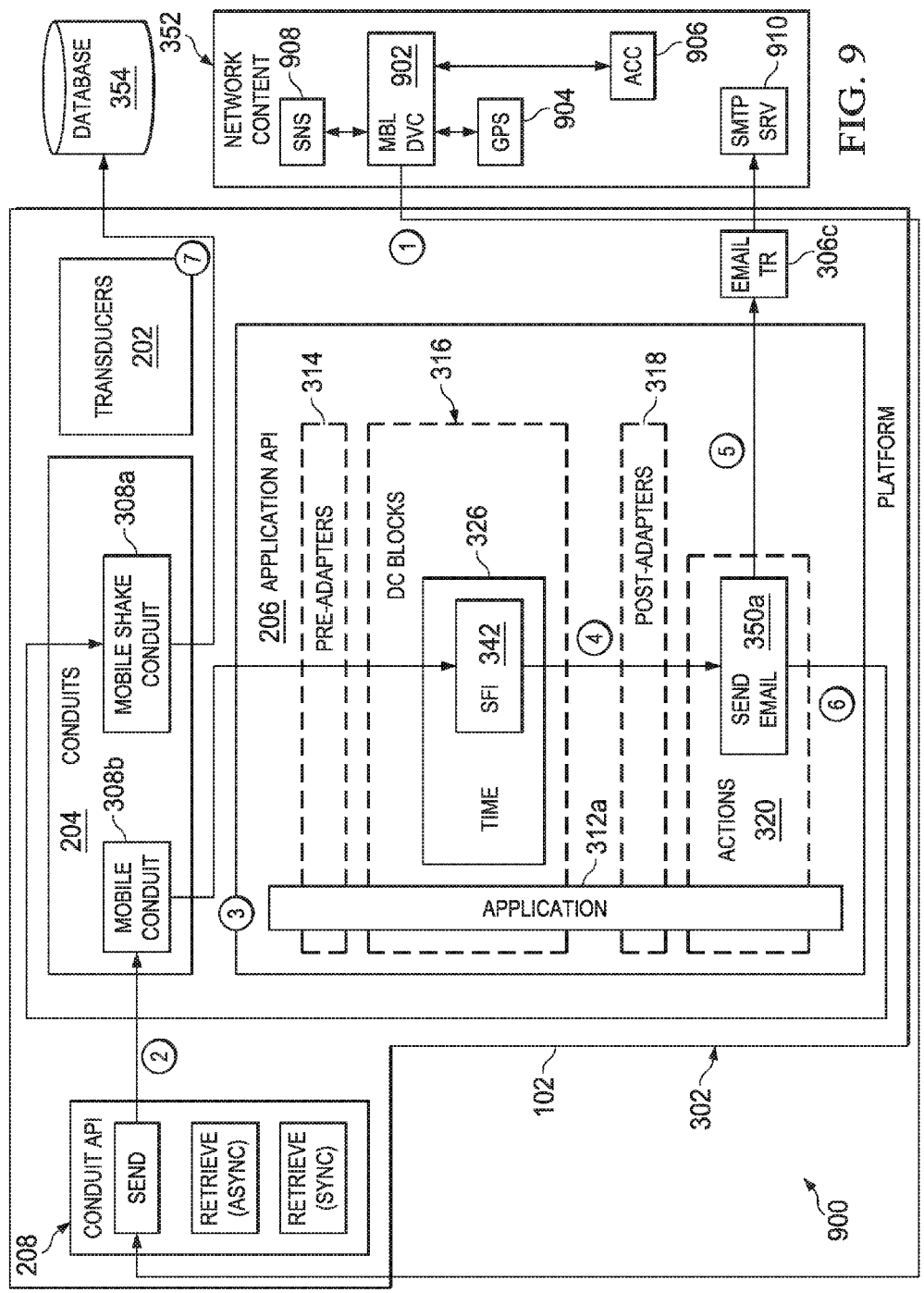
FIG. 9 is a diagram of one embodiment of the platform of FIG. 3 configured for a mobile device environment.

Referring to FIG. 9, one embodiment of environment 900 illustrates a specific application of the platform 102 of FIG. 3. In the present example, the platform 102 is to detect when a mobile device 902 has been shaken/dropped beyond a certain threshold by using an application 312a that can access an accelerometer 906 running on the device 902. The mobile device 902 may include a global positioning module 904 and various other sensors 908. Upon detection, the platform 102 is to send an email and archive the details of the signal object (e.g., GPS location, phone user, and/or timestamp) in the database 354. The application 312a is configured to not execute the notify or archive tasks more often than once every five minutes.

The platform 102 is configured with an email transducer 306c, mobile shake conduit 308a, a mobile conduit 308b, a time based SFI dynamic context block 342, a send email action 350a, and a conduit API 208 with options for send message, retrieve message (asynchronously), and retrieve message (synchronously). It is understood that all of the functionality of the platform 102 shown in FIG. 3 may be present in FIG. 9, but may be unused. In other embodiments, the platform 102 of FIG. 9 may be a stripped down version of the platform 102 of FIG. 3, with some or all of the unused functionality removed entirely.

For purposes of convenience, each item of the present example is represented in FIG. 9 by a number in a circle. As indicated by item 1, the present example relies on an application (not shown) running on the mobile device 902. The application may be a standalone application, an application running via a web-app, or implemented in any other way that is compatible with the device 902. The application understands and complies with the message protocol of the conduit API 208. For example, the application may send signal objects that are compatible with the internal structure of the platform 102. The application may deliver messages to the conduit API 208 on a regular basis (e.g., 1 message per second) and/or when a particular criterion is reached. Each message may contain pertinent information about the mobile device 902 (e.g., type of phone, accelerometer readings, GPS location, and phone number). No handshake is required and so once the application on the mobile device 902 elects to start sending data, the platform 102 is willing and able to accept the messages. Furthermore, since the application on the mobile device 902 understands the proper message protocol, no transducer is needed to translate the message for publishing to a conduit.

As indicated by item 2, the conduit API 208 can be configured to publish multiple signal objects to multiple conduits. In this example, the conduit API 208 is configured to publish signal objects received from mobile devices to the mobile conduit 308b. Accordingly, whenever a message is received from the mobile device 902, it is immediately published to the corresponding conduit 308b by the conduit API 208.

As indicated by item 3, the application 312a is configured to subscribe to the mobile conduit 308b. Since no pre-adapters are configured for use and a dynamic context block is configured for use, signal objects read from the mobile conduit 308b are immediately delivered to the dynamic context block, which is a SFI dynamic context block 342 in the present example. The SFI dynamic context block 342 is configured to only pass signal objects where the mobile device acceleration is greater than a configured threshold. Additionally, the SFI dynamic context block 342 is configured with an interval size of five minutes and will only allow one signal object to pass in those five minutes. This is where the control of the notification frequency is configured.

As indicated by item 4, a signal object passing through the SFI filer 342 is an indication that the mobile device 902 (or another mobile device) has been shaken beyond the configured threshold and no previous notification has been sent in the last five minutes. This mobile device signal object is then passed directly to the send email action 350a since no post-adapters have been configured for the application 312a.

As indicated by item 5, when the send email action 350a receives a mobile device signal object, the send email action 350a is configured to communicate with the email transducer 306c. The action can send the email transducer 306c any details that are included in the signal object including, but not limited to, the mobile device type, acceleration, and location. Once the email transducer 306c receives the information to be sent in the email, the email transducer 306c communicates via an external SMTP server 910 in order to send out the email message.

As indicated by item 6, the application 312a is configured to direct its output to the mobile shake conduit 308a. Once the application 312a completes, any output signal objects (which in this case is the mobile device signal object) are published to that conduit. In effect, to the mobile shake conduit 308a will contain signal objects that indicate that a mobile device has been shaken/dropped and will never contain more than one signal object in the notification frequency window.

As indicated by item 7, in the present example, an optional data aggregator (not shown) is configured to subscribe to the mobile shake conduit 308a. Therefore, any signal objects sent along the mobile shake conduit 308a may be aggregated and/or archived to one or more databases 354 based on the configuration. This data archive functionality will occur asynchronously.

Figure 10:
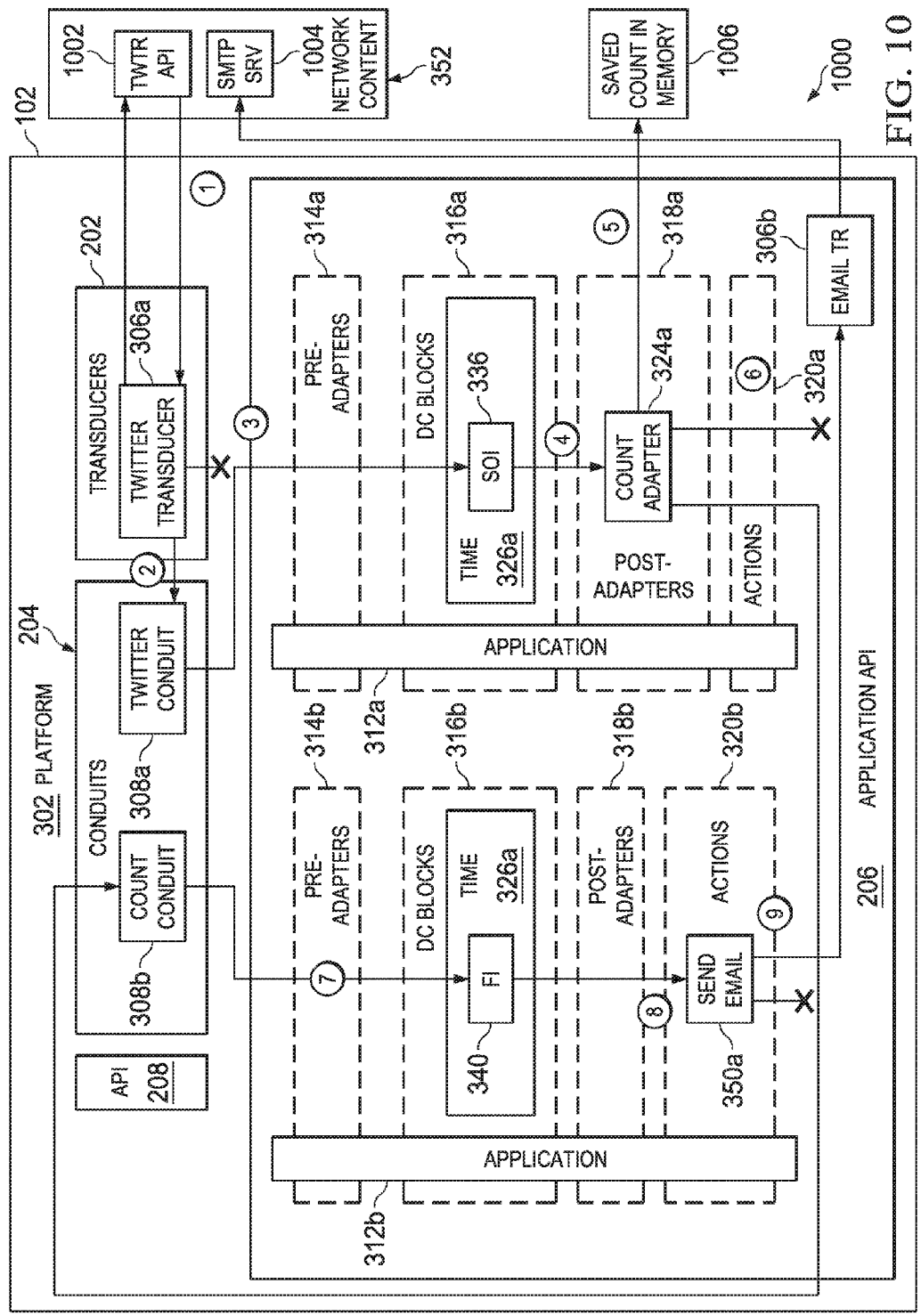
FIG. 10 is a diagram of one embodiment of the platform of FIG. 3 configured for a web services environment.

Referring to FIG. 10, one embodiment of environment 1000 illustrates a specific application of the platform 102 of FIG. 3. In the present example of published web content, the platform 102 is to connect to a Twitter (a trademark of Twitter, Inc., of San Francisco, Calif.) Search API 1002, poll for tweets pertaining to a certain keyword, and count how many tweets meet this criterion. The platform 102 is to send an email via an SMTP server 1004 containing that count at 8:00 AM each day. This embodiment provides an example of a multiple-application setup where two applications 312a and 312b exist on the platform 102.

The platform 102 is configured with a twitter transducer 306a, an email transducer 306b, a twitter conduit 308a, a count conduit 308b, and the two applications 312a and 312b. The application 312a is configured with an SOI dynamic context block 326a and a counting post-adapter 324a. The application 312b is configured with an FI dynamic context block 340 and a send email action 350a. It is understood that all of the functionality of the platform 102 shown in FIG. 3 may be present in FIG. 10, but may be unused. In other embodiments, the platform 102 of FIG. 10 may be a stripped down version of the platform 102 of FIG. 3, with some or all of the unused functionality removed entirely.

For purposes of convenience, each item of the present example is represented in FIG. 10 by a number in a circle. As indicated by item 1, the process begins with the twitter transducer 306a communicating with the Twitter Search API 1002. Using the Twitter REST protocol, the twitter transducer 306a sends a search request and receives a response from the Twitter Search API 1002 containing the tweets that match the request. The request to the Twitter Search API 1002 may include keywords for which to search and/or search constraints such as location boundaries (e.g., anything the Twitter Search API 1002 supports).

As indicated by item 2, whenever the twitter transducer 306a receives a response of tweets from the Twitter Search API 1002, the twitter transducer 306a converts those tweets into individual TwitterSignalObjects. This is an example of a dynamic new signal object. Each tweet has one signal object. Furthermore, the twitter transducer 306a has the ability to determine if the system has "seen" a specific tweet before or not, which in effect provides the platform 102 with the ability to remove duplicate tweets. The twitter transducer 306a can then dynamically de-allocate any signal objects created for duplicate tweets before they have even been published to a conduit. The significant TwitterSignalObjects are published into the twitter conduit 308a for use by applications.

As indicated by item 3, the application 312a is set up to listen to the twitter conduit 308a from which the TwitterSignalObjects will be read. No pre-adapters are necessary for the application 312a. The application 312a has an SOI dynamic context block 336 set up with an interval size of one signal object. The SOI dynamic context block 336 may pass on any relevant TwitterSignalObjects from the twitter conduit 308a. This relevance is configurable and could include filters based on language of the tweet, time of the tweet, etc. Accordingly, the SOI dynamic context block 336 may be used to filter out tweets that are not considered relevant, such as tweets that are not in English or tweets from accounts that do not have at least a certain number of followers. The platform 102 has the option of adding further dynamic context to the tweets at the SOI dynamic context block 336 but does not do so in this application.

As indicated by item 4, signal objects that pass through the SOI dynamic context block 336 are indications of tweets that should be counted. Accordingly, the signal objects are passed the counting post-adapter 324a that is responsible for counting the number of tweets seen by the platform 102 at this point.

As indicated by item 5, the counting post-adapter 324a will receive a number of input TwitterSignalObjects and maintain a count of the number of signal objects received. Since the application 312a is stateless by itself, the counting post-adapter 324a must access a saved count 1006 that has been stored in memory. The counting post-adapter 324a performs a lookup of the old count, adds to it the number of input signal objects, and updates the saved count 1006 with this new quantity. The counting post-adapter 324a will then pass along the existing TwitterSignalObjects as well as a new signal object called a CounterSignalObject. This new signal object contains the current count as well as a cumulative count of signal objects that have been seen. This is an example of a dynamic new signal object.

As indicated by item 6, the counting post-adapter 324a outputs both TwitterSignalObjects and CounterSignalObjects. The application 312a has no actions associated with it (as the email action will occur in the second application 312b). The application 312a is configured to publish all CounterSignalObjects to the count conduit 308b so that other applications may reference them. Any other signal objects (e.g., TwitterSignalObjects) are de-allocated at this point.

As indicated by item 7, the second application 312b is configured to listen to the count conduit 308b for CounterSignalObjects. When a CounterSignalObject is detected, it is passed to the FI dynamic context block 340 configured in the application 312b. This particular dynamic context block is configured to only pass signal objects between the times of 8:00 AM and 8:01 AM. If a CounterSignalObject is passed to the FI dynamic context block 340 at any time outside of the configured time window, the CounterSignalObject will be dynamically de-allocated.

As indicated by item 7, when a CounterSignalObject is passed through the FI dynamic context block 340, it indicates that a count has been detected between the times of 8:00 AM and 8:01 AM. This CounterSignalObject is then passed to the send email action 350a so that the daily summary email can be sent out at the proper time.

As indicated by item 9, the send email action 350a is configured to communicate with the email transducer 306b. When the send email action 350a receives a CounterSignalObject, the send email action 350a sends the desired email information to the email transducer 306b. The email transducer 306b then communicates with the external SMTP server 1004 to send the email asynchronously.

Figure 11A:
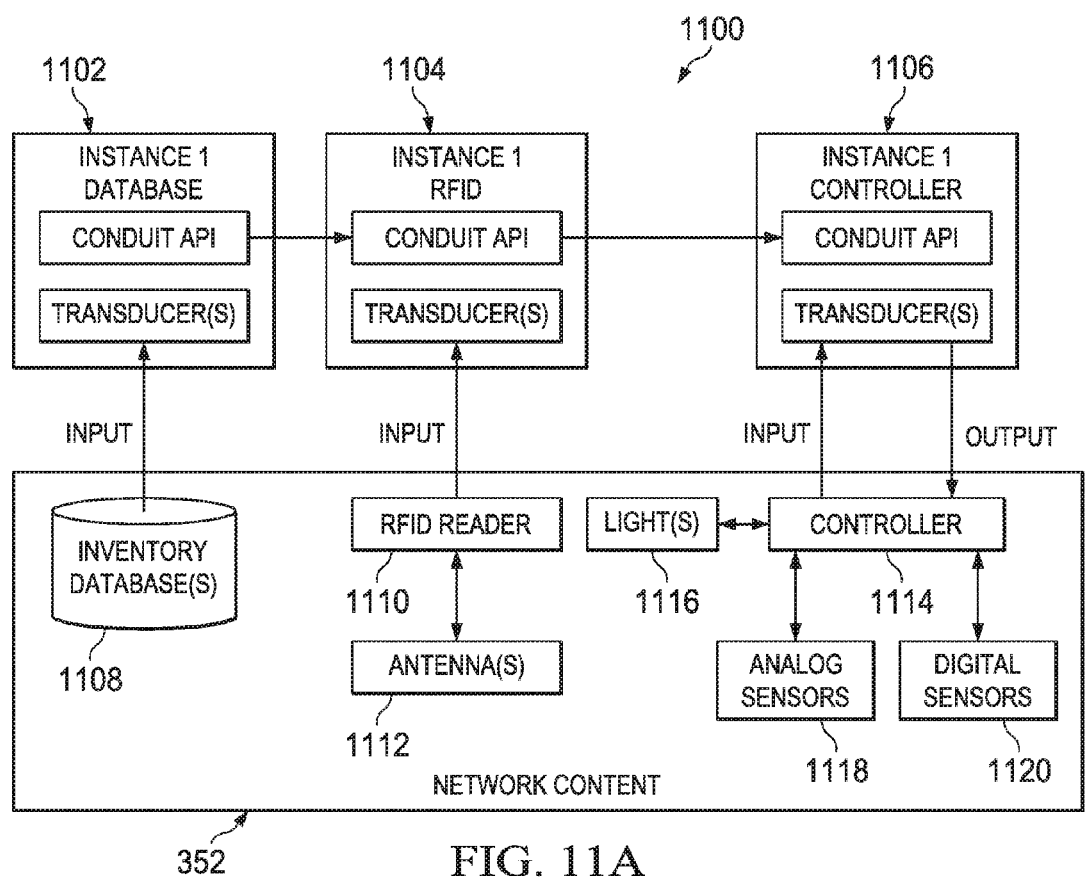
FIGS. 11A-11D are a diagrams of one embodiment of the platform of FIG. 3 configured for a perishable goods environment.

Referring to FIGS. 11A-11D, one embodiment of environment 1100 illustrates a specific application of the platform 102 of FIG. 3. Referring specifically to FIG. 11A, in the present example, three separate instances of the platform 102 are used as denoted in FIG. 11A by database instance 1102, RFID instance 1104, and controller instance 1106. Each instance 1102, 1104, and 1106 can run in an independent environment (e.g., in an embedded manner, in the cloud, or on a server) or they can all be running in the same environment. The database instance 1102 is responsible for connecting to and processing one or more inventory databases 1108, which can reside anywhere on the network. The RFID instance 1104 is responsible for processing RFID tags read by an RFID reader 1110 that is coupled to antenna(s) 1112. The controller instance 1106 is responsible for receiving input from and actuating a controller 1114 that can connect to analog and digital signal devices/sensors such as lights 1116, analog sensors 1118, and digital sensors 1120. Using all three instances 1102, 1104, and 1106, a notification is to be sent to someone by turning on a light 1116 when a product that has been marked as a business process exception (e.g., perishable out of specification) in the inventory database 1108 is detected by the RFID reader 1110 and the temperature of the environment is above a certain threshold as detected by the controller 1114.

Figure 11B:
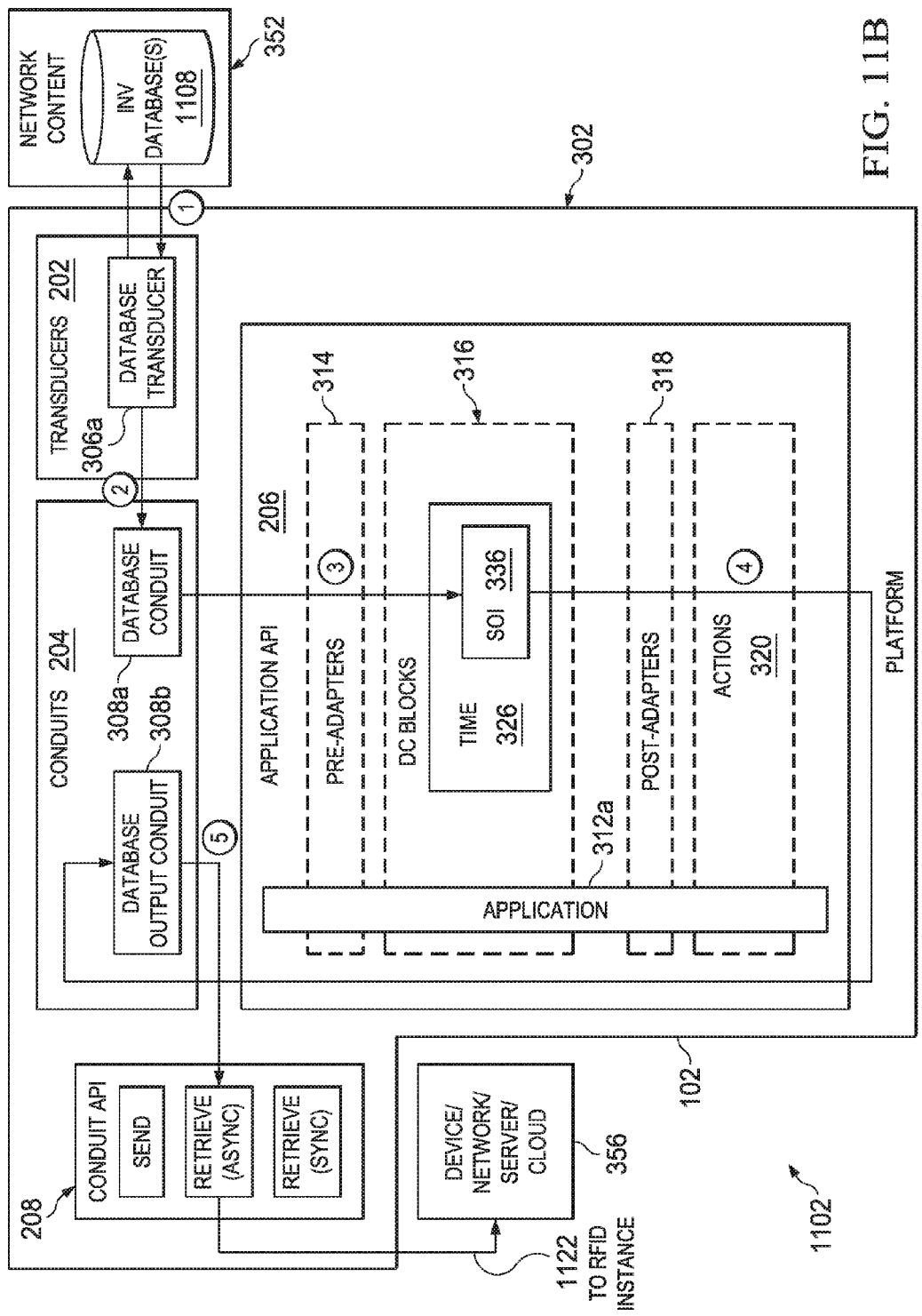

Referring specifically to FIG. 11B, which illustrates the database instance 1102, the platform 102 is configured with a database transducer 306a, a database conduit 308a, a database output conduit 308b, and an application 312a with an SOI dynamic context block 336. It is understood that all of the functionality of the platform 102 shown in FIG. 3 may be present in FIG. 11B, but may be unused. In other embodiments, the platform 102 of FIG. 11B may be a stripped down version of the platform 102 of FIG. 3, with some or all of the unused functionality removed entirely.

For purposes of convenience, each item of the present example is represented in FIG. 11B by a number in a circle. As indicated by item 1, the database transducer 306a is communicatively coupled to the inventory database 1108. The inventory database 1108 can be any type of database (e.g., relational, NoSQL, and/or any other type). The database transducer 306a is responsible for sending a query to the inventory database 1108 and the database 1108 will return the results of the query. In this example, the database transducer 306a will query the inventory database 1108 for any products that are due to arrive at a shipping facility representing at least a part of the environment 1100 of FIG. 11A.

As indicated by item 2, once the database transducer 306a receives the query results containing the shipped items, the database transducer 306a will convert the results into a message format understood by the platform 102. Each database item will correspond to an internal message (e.g., a signal object) containing the properties of that item (e.g., quantity and whether it is perishable). Each of these signal objects is then published to the database conduit 308a.

As indicated by item 3, the application 312a running on the database instance 1102 is configured to subscribe to the database conduit 308a. When internal signal objects are published to the database conduit 308a, the application 312a (which has no pre-adapters) receives them and sends them to the SOI dynamic context block 336. The SOI dynamic context block 336 is configured to dynamically de-allocate any signal object where the corresponding database item has not been marked as "perishable."

As indicated by item 4, once a signal object has passed through the SOI dynamic context block 336, it means that an inventory data item has been marked perishable. The application 312a (which has no post-adapters or actions) is now complete and is configured to send output signal objects to the database output conduit 308b. The database output conduit 308b will contain all of the database items that are marked perishable and are due to arrive at the shipping facility.

As indicated by item 5, the conduit API 208 of the database instance 1102 has been configured to subscribe to the database output conduit 308b and forward any messages from that conduit to the subscribers of the conduit API 208. In this example, the RFID instance 1104 has been configured as a subscriber to the conduit API 208 of the database instance 1102. Therefore, when signal objects are published to the database output conduit 308b of the database instance 1102, they are forwarded through the conduit APIs of the database instance 1102 and the RFID instance 1104 as indicated by arrow 1122.

Figure 11C:
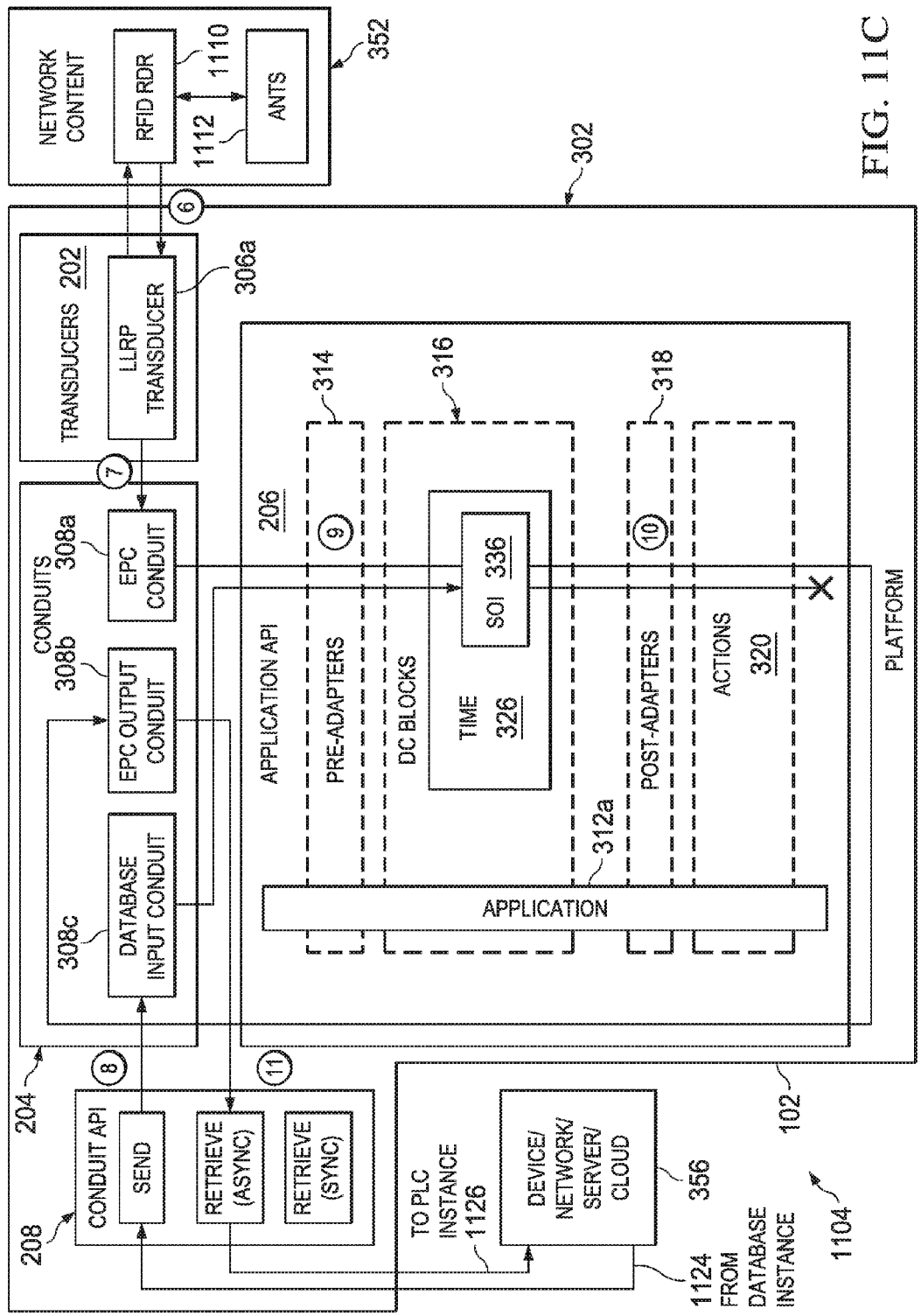

Referring specifically to FIG. 11C, which illustrates the RFID instance 1104, the platform 102 is configured with an LLRP transducer 306a, an EPC conduit 308a, an EPC output conduit 308b, a database input conduit 308c, and an application 312a with an SOI dynamic context block 336. It is understood that all of the functionality of the platform 102 shown in FIG. 3 may be present in FIG. 11C, but may be unused. In other embodiments, the platform 102 of FIG. 11C may be a stripped down version of the platform 102 of FIG. 3, with some or all of the unused functionality removed entirely.

For purposes of convenience, each item of the present example is represented in FIG. 11C by a number in a circle. As indicated by item 6, the first step is the handshake between the LLRP transducer 306a and the RFID reader device 1110. The RFID reader 1110 converts the RF signals read by the antennas 1112 into a digital signal understood by the LLRP transducer 306a. The LLRP transducer 306a initiates the handshake by providing a read cycle length and requesting that the RFID reader 1110 send its tags. The RFID reader 1110 acknowledges and sends a "bundle of tags" read to the LLRP transducer 306a once per the specified read cycle.

As indicated by item 7, whenever the LLRP transducer 306a receives a bundle of tags from the RFID reader 1110, the LLRP transducer 306a converts those tags into individual RFID tag signal objects. This is an example of a dynamic new signal object. Each tag read corresponds to one internal signal object. These internal signal objects are published by the LLRP transducer 306a into the EPC conduit 308a for use by applications.

As indicated by item 8, while the LLRP transducer 306a is processing tags from the RFID reader 1110, the conduit API 208 of the RFID instance 1104 is simultaneously (asynchronously) receiving inventory database signal objects from the database instance 1102 as indicated by arrow 1124. Whenever a database signal object is received via the conduit API 208 of the RFID instance 1104, the signal object is immediately published to the database input conduit 308c.

As indicated by item 9, the application 312a running on the RFID instance 1104 is configured to subscribe to both the EPC conduit 308a and the database input conduit 308b. Accordingly, the application 312a will be handling and applying logic to multiple types of signal objects. As signal objects are published to the EPC conduit 308a and the database input conduit 308b, they are forwarded to the SOI dynamic context block 336 defined for the application 312a (which has no configured pre-adapters). The SOI dynamic context block 336 is configured to associate a database item signal object with an RFID tag signal object. When a database item signal object corresponds to an RFID tag signal object, the pair of signal objects is delivered through the SOI dynamic context block 336. If a database item signal object is found but the corresponding RFID tag signal object is not found, the signal objects are dynamically de-allocated until the next cycle. Likewise, if the RFID tag signal object is found but the database item signal object is not found, the signal objects are dynamically de-allocated until the next cycle.

As indicated by item 10, when a pair of signal objects is delivered from the SOI dynamic context block 336, it is an indication that an item that has been marked perishable in the inventory database 1108 and is due to arrive at the facility has been detected by the RFID reader 1110. At this point, the application 312a of the RFID instance 1104 no longer needs the database item signal object because the association to the RFID tag read has been made, so the database item signal object is dynamically de-allocated. However, the RFID tag signal object is still needed for processing by the controller instance 1106 for association with the current temperature. Accordingly, the RFID tag signal object is delivered to the EPC output conduit 308b.

As indicated by item 11, the conduit API 208 of the RFID instance 1104 has been configured to subscribe to the EPC output conduit 308b and forward any signal objects on the EPC output conduit 308b to the subscribers of the conduit API 208. In this scenario, the controller instance 1106 has been set up as a subscriber to the conduit API 208 on the RFID instance 1104. Therefore, when signal objects are published to the EPC output conduit 308b on the RFID instance 1104 they are forwarded through the conduit APIs of the RFID instance 1104 and the controller instance 1106 as indicated by arrow 1126.

Figure 11D:
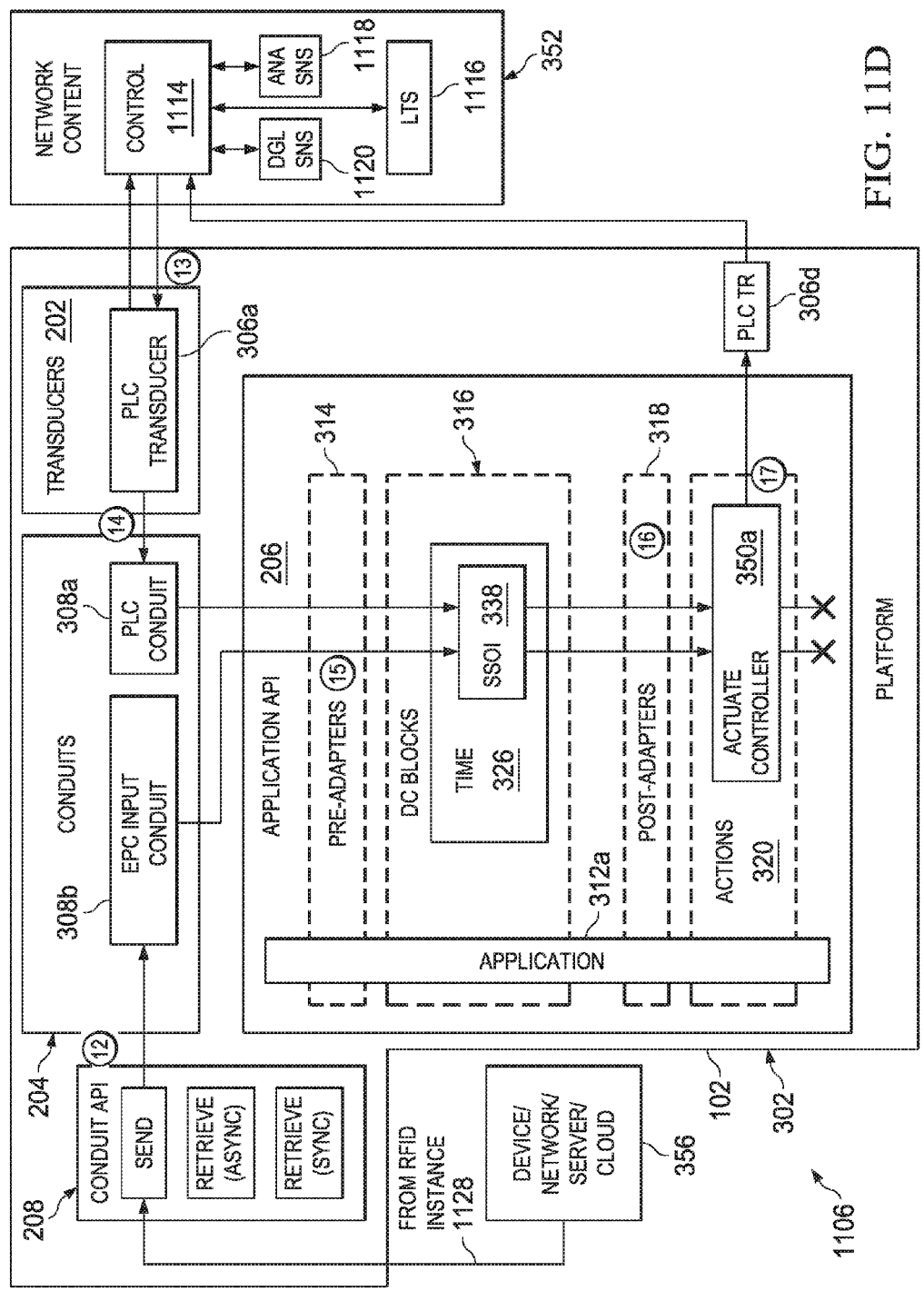

Referring specifically to FIG. 11D, which illustrates the controller instance 1106, the platform 102 is configured with a PLC transducer 306a, a PLC conduit 308a, an EPC input conduit 308b, and an application 312a with an SSOI dynamic context block 338 and an actuate controller action 350a. It is understood that all of the functionality of the platform 102 shown in FIG. 3 may be present in FIG. 11D, but may be unused. In other embodiments, the platform 102 of FIG. 11D may be a stripped down version of the platform 102 of FIG. 3, with some or all of the unused functionality removed entirely.

For purposes of convenience, each item of the present example is represented in FIG. 11D by a number in a circle. As indicated by item 12, while the PLC transducer 306a is processing input from the controller 1114, the conduit API 208 on the controller instance 1106 is simultaneously (asynchronously) receiving RFID tag signal objects from the RFID instance 1104 as indicated by arrow 1128. Whenever an RFID tag signal object is received via the conduit API 208, it is immediately published to the EPC input conduit 308*b*.

As indicated by item 13, the controller instance 1106 is connected over a network to the controller 1114 (e.g., a PLC) that can deliver digital input from both the analog sensors 1118 and the digital sensors 1120. This example requires that a temperature sensor be coupled to the controller 1114 and that the readings are delivered as a digital signal to the PLC transducer 306*a*. Similar to the handshake that occurs with the LLRP transducer 306*a* of FIG. 11C, the PLC transducer 306*a* conducts a handshake that notifies the controller 1114 that the PLC transducer 306*a* is listening for PLC messages. From this point forward, the controller 1114 will deliver its messages to the PLC transducer 306*a*.

As indicated by item 14, when the PLC transducer 306*a* receives input from the controller 1114, the PLC transducer 306*a* converts the input from the PLC format of the controller 1114 to the internal signal object format of the platform 102. The signal objects are then published by the PLC transducer 306*a* to the PLC conduit 308*a* for processing by applications.

As indicated by item 15, the application 312*a* on the PLC instance 1106 is configured to subscribe to both the PLC conduit 308*a* and the EPC input conduit 308*b*. Signal objects published to the PLC conduit 308*a* and the EPC input conduit 308*b* will be delivered to the SSOI dynamic context block 338 of the application 312*a* (which has not pre-adapters configured). The SSOI dynamic context block 338 is configured to associate the RFID tag signal objects with the PLC temperature reading signal objects. The SSOI dynamic context block 338 will only pass on a pair of signal objects if the PLC temperature reading is above a configured threshold.

As indicated by item 16, when a pair of signal objects is delivered from the SSOI dynamic context block 338, it is an indication that a perishable item has been detected by the RFID reader 1110 and that the temperature in the environment is too high as monitored by the controller 1114. This indicates a problem and a notification will need to occur. Therefore, the signal objects are delivered to the actuate controller action 350*a*, which is configured to handle the notification. After the actuate controller action 350*a* occurs, the signal objects are no longer needed and are dynamically de-allocated.

As indicated by item 17, the actuate controller action 350*a* is configured to communicate with the PLC transducer 306*a*. When the actuate controller action 350*a* receives an RFID tag signal object, the actuate controller action 350*a* communicates the desired action to the PLC transducer 306*a*. In this example, the desired action for the controller 1114 is to turn on a light 1116. Accordingly, the PLC transducer 306*a* translates the desired action into a binary sequence that is understood by the controller 1114.

In another embodiment, the platform 102 may support automatic identification data capture (AIDC) (inclusive of RFID) point-of-sale (POS) technologies with other input source (inclusive of data base records) interoperability, filtering, enrichment, and actions from a self-contained system/platform. The platform 102 may provide real-time processing, handling, filtering, enrichment (time-space-state), and configuration of pre-determined actions from data/message/events generated from Point-of-Sale technologies including automatic identification data capture (AIDC) technologies such as bar code, RFID, optical character recognition (OCR), and/or biometrics within a self contained/independent signal processing platform. The platform 102 provides the capability to support OEM technologies and/or independently process a POS transaction which starts an automated inquiry/verification of product availability levels and/or other pertinent information from disparate records and returns an action or no action recommendation or pre-defined automated transaction.

Figure 12:
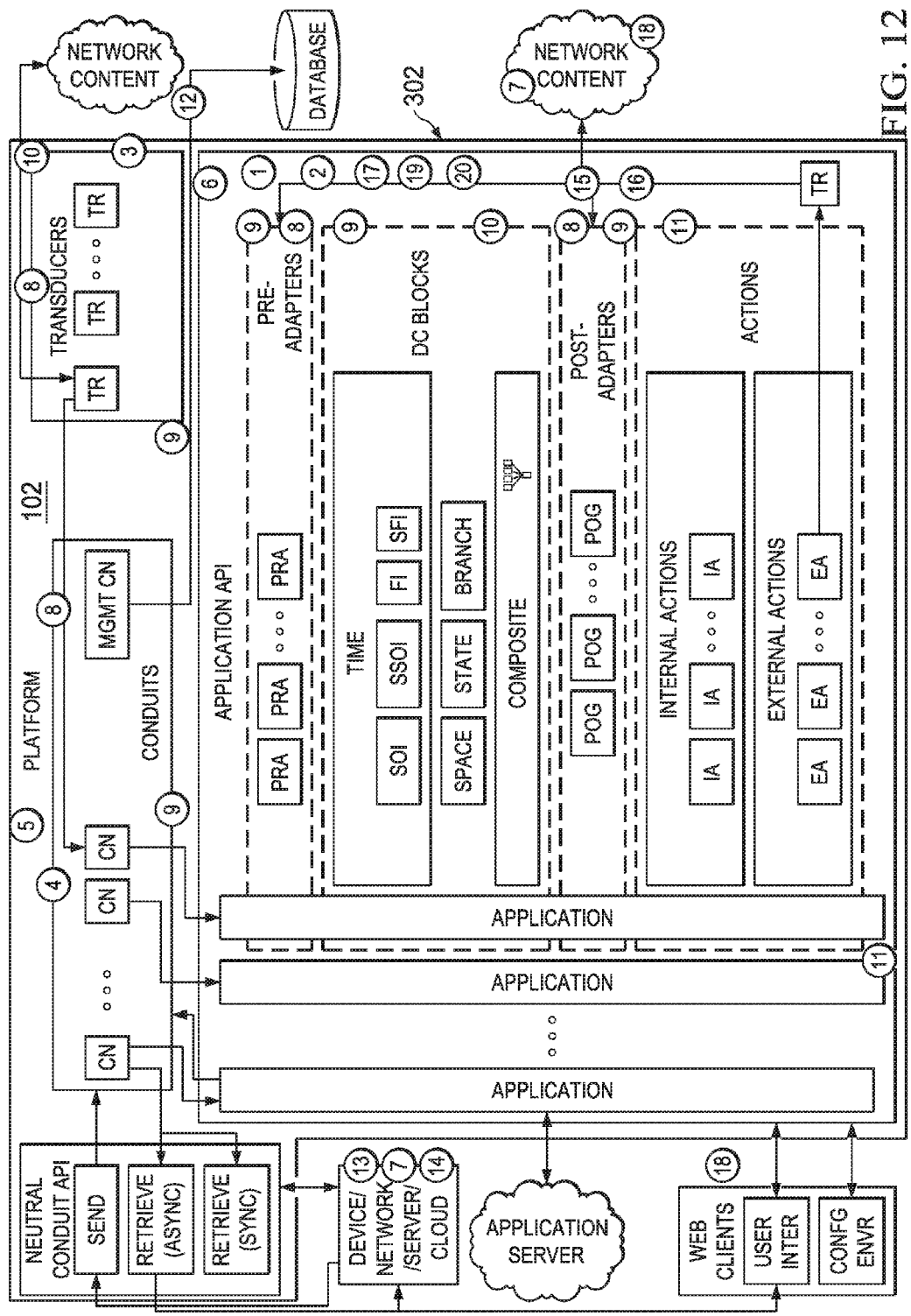
FIG. 12 is a diagram of one embodiment of the platform of FIG. 3 illustrating various design constructs that may be embodied by the platform.

Referring to FIG. 12, one embodiment of the platform 102 of FIG. 3 provides an example of a design construct of the platform 102 and/or architecture 302 with various reference items represented as numbers in circles. With respect to the design construct itself and associated model, terms, and key elements, there are various considerations, including considerations that may serve as foundational design constructs for the platform 102. These include ecology, economic theory, the Internet, technology advancements and anticipation of future capabilities, and barriers to universal application and user adoption.

With respect to ecology, the design seeks to enable the highest level of synergy between independent elements. With respect to economic theory, the design considers the technology enabled shift from supply emphasis models to demand based models and systems. With respect to the Internet, the design considers the Internet's evolution and realization of benefits and innovation. With respect to technology advancements and anticipation of future capabilities, the design thoughtfully yet pragmatically considers the rapid advancement of areas such as micro processing, networking, mobility, social-collective-artificial intelligence, as well as the commercial and user adoption trends, auto-id, machine-to-machine, Internet of Things, cloud infrastructure, big data, and systems on a chip. With respect to barriers to universal application and user adoption, the design seeks to resolve the primary constraints to realizing current and available benefits of technology. With respect to inherent solution design bias, also referred to as strategic tax, interests are balanced. A review of commercially available solutions may reveal a common element of design biased to existing portfolio assets in hardware, network, software, and/or hosting/professional services The platform 102 may be designed based on a discipline of the design elements, which focuses on providing a solution that addresses the design considerations. Accordingly, the design may embody and promote the following items.

With respect to item 1, the platform 102 may provide neutrality. Accordingly, the platform 102 may be without pre-determined or strategic alignment or bias to any existing hardware, networking, software, or standards. The design mandate may oppose a strategic tax and the basis of the design construct may resist any and all proprietary motive. With respect to item 2, the platform 102 may be open. Accordingly, the platform 102 may be without pre-established or inclusive encumbrance of commercial license restrictions. To accomplish this element, the platform 102 may use only open source license software code. With respect to item 3, the platform 102 may be input source independent. Accordingly, the platform 102 may accommodate to any viable digital format, protocol, schema, event, and/or message.

With respect to item 4, the platform 102 may be interoperable. Accordingly, the platform 102 may promote additional enhanced functionality and extension services simplistically by leveraging best of class API within a seamless Service Oriented Architecture (SOA) capability. With respect to item 5, the platform 102 may be autonomic.

Accordingly, the platform 102 may include the self-managing ability to adapt to unpredictable demand and disguise complexity from users.

With respect to item 6, the platform 102 may be self-managing as defined by four functional areas and five evolutionary levels. The four functional areas include self-configuration (e.g., the automatic configuration of components), self-healing (e.g., automatic discovery and correction of faults), and self-protection (e.g., proactive identification and protection from arbitrary attacks). The five evolutionary levels provide an autonomic deployment model for its deployment and include Level 1, which is the basic level that presents the current situation where systems are essentially managed manually. Levels 2-4 introduce increasingly automated management functions, while level 5 represents the ultimate goal of autonomic, self-managing systems.

With respect to item 7, the platform 102 may be adaptive. Accordingly, the platform 102 may maintain the highest level of system architecture application flexibility and heterogeneous input to be applied and deliver homogeneous or pervasive/ubiquitous application benefits. With respect to item 8, the platform 102 may provide dynamic asynchronous processing. Accordingly, the platform 102 may accommodate uncertainty by dynamically accommodating, defining, constructing new/enriching context, and deconstructing unnecessary elements (e.g., noise). With respect to item 9, the platform 102 may provide dynamic context addition and enrichment. Accordingly, the platform 102 may provide configurable levels of input refinement, filtering, and enrichment. With respect to item 10, the platform 102 may provide contextual adaptive awareness. Accordingly, the platform 102 may provide the ability to simply configure contextual logic within levels of input filtering/enrichment and pre-configured applications with applied time, space, and state context or temporal, state, and spatial awareness based on an input, association, system, or network of inputs within an application or grouping of applications.

With respect to item 11, the platform 102 may provide applied actions. Accordingly, the platform 102 may provide configurable bi-directional visualization, reporting, notification, publication, and/or automation of digital actuation. With respect to item 12, the platform 102 may provide independence from data archiving. Accordingly, the platform 102 may provide self-contained functionality without a pre-determined requirement/dependency for data archiving. Data archiving should be a user determination and not a required system/application function. Data archiving should be user selective as finite/meta or any pre-determined requirement from 0-100%.

With respect to item 13, the platform 102 may be embeddable. Accordingly, the platform 102 may provide a true distributed computing architecture that provides for user determined hardware application. The only requirement is a CPU. This design provides the embodiment of self-aware device(s) and devices within a system of devices enabling an intelligence system. This requires an efficient small footprint solution design with a minimal CPU requirement. With respect to item 14, the platform 102 may provide federated instances. Accordingly, the embeddable footprint provided by the platform 102 provides for a user defined integration platform host architecture. The platform 102 may reside on a device, a network router/switch, server, cloud or any federation of host. Further, the host may be configurable to interact independent self-aware instances or within a system of self and system aware instances.

With respect to item 15, the platform 102 may be real-time or near real-time. Generally, it has become acceptable to claim real-time capability based on the limitation of the solution. The platform 102 provides for a minimum of two hundred signal objects per second processing based on a minimal embedded chip integration and scalable signal object processing performance commiserate to the level of processing capability. With respect to item 16, the platform 102 may provide minimal system latency. Accordingly, the platform 102 may accommodate input and/or streams of input and perform a full-cycle application in milliseconds to microseconds depending on the number of independent inputs and complexity of applied context (logic).

With respect to item 17, the platform 102 may provide protean versatility. The embeddable footprint of the platform 102 provides ultimate and necessary versatility. The platform 102 may be applied as simply/minimally as device firmware, middleware, niche application, a self-contained platform within any hosting environment, and/or any user determined application combination. With respect to item 18, the platform 102 may provide progressive adoption capability. Unlike many software tools that require a designed in forced method or use requirement, the platform 102 provides for progressive user centric adoption of functionality. For instance, a user may only elect to use the platform 102 as an integration tool for disparate incompatible applications or as a platform to pre-filter and enrich all inbound information input.

With respect to item 19, the platform 102 may provide a universal strategic implication. The current paradigm of heterogeneous technologies is a product of the commercial battle for control of adoption and market share. The focus on control promotes a lack of interoperability with designed-in "walled gardens" and point solutions. The platform 102 provides for a shift of control to the user by lessening dependence on proprietary solutions and breaking the current adoption method of bias. For example, forecasts suggest that there will be trillions of "things" communicating independently across the Internet. The platform 102 provides users with an adoption alternative to disparate incompatible proprietary tools by creating a standard API to require commercial solutions to adapt to as a condition of sale.

With respect to item 20, the platform 102 may support an 'On Users Terms' approach. This may be viewed as the overarching design construct for all elements of the platform 102. The platform 102 does not impose integration or application upon a user, instead integrating with existing tools, supplementing existing processes, and/or enabling new levels of awareness and control.

In some embodiments, the platform 102 may provide a high agility (accomplished by footprint reference Universal Turing Machine), universal (neutral), content aware (any source), context sensitive (time, space, and state), self configuring (composite context without requiring outside of platform reference or polling on a database), control system combined in a single self-contained agile platform. The platform 102 may provide an agile universal content aware context sensitive orchestration (or compose, choreograph, orchestrate, and perform) (or instrumentation) and control platform. The platform 102 may provide an adaptive context sensitive orchestration platform. The platform 102 may provide an orchestration alternative (e.g., provides precision in operations or intelligence and control). The platform 102 may provide a universal context adaptive intelligence/operating and control platform. The platform 102 may provide a combination of functionality into an independent agile platform.

The platform 102 may provide a solution to the signal to action performance requirement by decoupling and re-orienting the function of database storage. The platform 102 may provide a solution to the integration challenge by enabling independent CPU/device and interoperable system CPU of devices. The platform 102 may provide a solution to the point solution/walled garden challenge by performing interoperable independent adaptive filtering, enrichment, and actions.

Figure 13A:
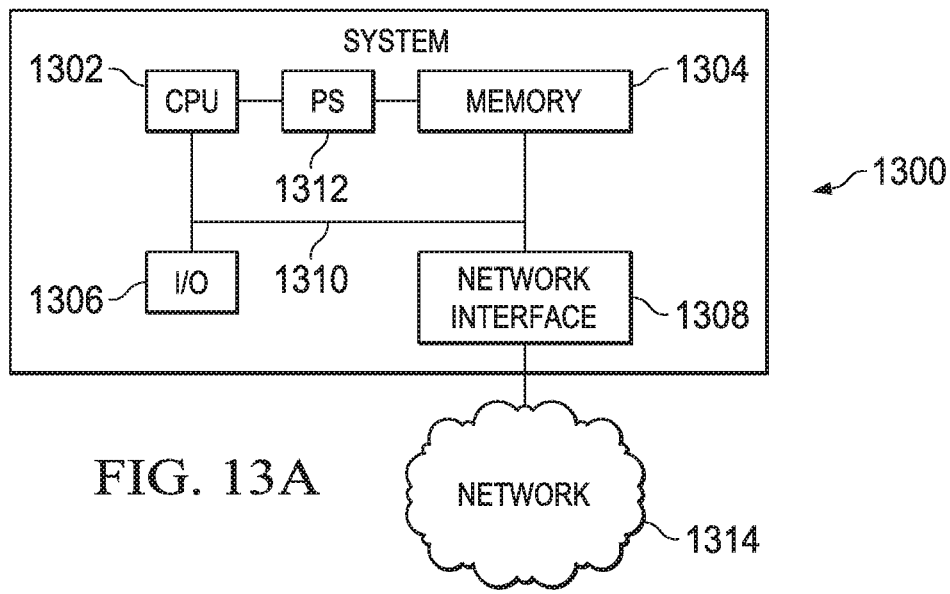
FIGS. 13A-13C are diagrams of embodiments of systems that may be used in the environments of FIGS. 1A-1C, 2A, and 3.

Referring to FIG. 13A, one embodiment of a system 1300 is illustrated. The system 1300 is one possible example of a device 112 of FIG. 1. The system 1300 may include a controller (e.g., a central processing unit ("CPU")) 1302, a memory unit 1304, an input/output ("I/O") device 1306, and a network interface 1308. The components 1302, 1304, 1306, and 1308 are interconnected by a transport system (e.g., a bus) 1310. A power supply (PS) 1312 may provide power to components of the system 1300, such as the CPU 1302 and memory unit 1304. It is understood that the system 1300 may be differently configured and that each of the listed components may actually represent several different components. For example, the CPU 1302 may actually represent a multi-processor or a distributed processing system; the memory unit 1304 may include different levels of cache memory, main memory, hard disks, and remote storage locations; the I/O device 1306 may include monitors, keyboards, and the like; and the network interface 1308 may include one or more network cards providing one or more wired and/or wireless connections to a network 1314. Therefore, a wide range of flexibility is anticipated in the configuration of the system 1300.

The system 1300 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and other computing platforms depending on the use of the system 1300. The operating system, as well as other instructions (e.g., for telecommunications and/or other functions provided by the device 112), may be stored in the memory unit 1304 and executed by the processor 1302. For example, if the system 1300 is the device 112, the memory unit 1304 may include instructions for performing some or all of the message sequences and methods described herein.

The network 1314 may be a single network or may represent multiple networks, including networks of different types. For example, the device 112 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 112 with external devices.

Figure 13B:
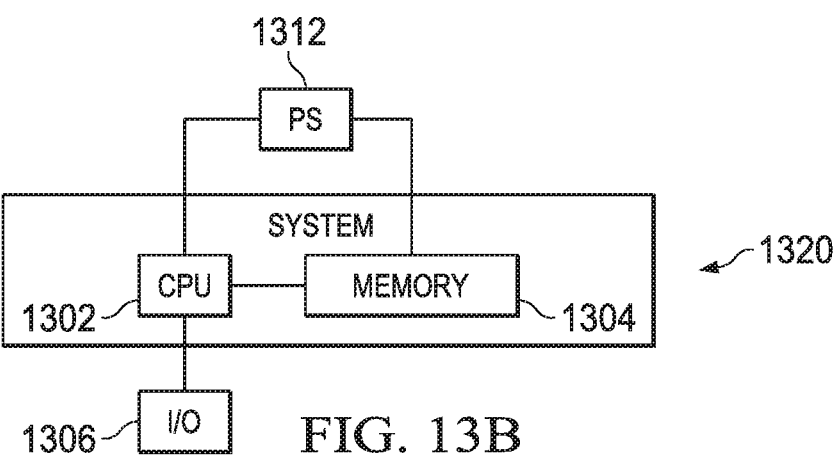

Referring to FIG. 13B, one embodiment of a system 1320 is illustrated. The system 1320 is one possible example of a device 112 of FIG. 1. The system 1320 may be similar to the system 1300 of FIG. 13A, but may contain only the CPU 1302 and memory 1304. Other components, such as the power supply 1304 and I/O 1306, may be external. In the present example, the system 1302 may have no network capability.

Figure 13C:
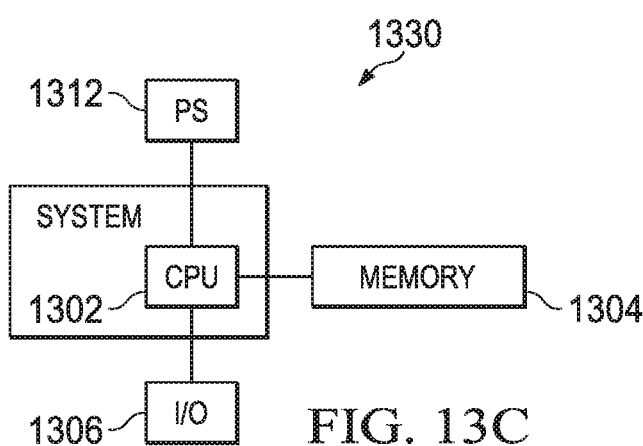

Referring to FIG. 13C, one embodiment of a system 1330 is illustrated. The system 1330 is one possible example of a device 112 of FIG. 1. The system 1330 may be similar to the system 1320 of FIG. 13B, but may contain only the CPU 1302. The memory 1304 and other components, such as the power supply 1304 and I/O 1306, may be external. For example, the system 1304 may rely on an external drive. In the present example, the system 1302 may have no network capability. In other embodiments, the system 1302 may access the memory 1304 via a network such as the network 1314 of FIG. 13A.

It is understood that the sequence diagrams and flow charts described herein illustrate various exemplary functions and operations that may occur within various communication environments. It is understood that these diagrams are not exhaustive and that various steps may be excluded from the diagrams to clarify the aspect being described. For example, it is understood that some actions, such as network authentication processes and notifications, may have been performed prior to the first step of a sequence diagram by a mobile devices 112. Such actions may depend on the particular type and configuration of the device 112, including how network access is obtained (e.g., cellular or WLAN access). Other actions may occur between illustrated steps or simultaneously with illustrated steps, including network messaging for call maintenance (including handoffs), communications with other devices (e.g., email, text messages, and/or voice calls (including conference calls)), and similar actions.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Some steps may be performed in an order different from that shown and/or may overlap. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A platform architecture that is configurable to provide task specific application instances compatible with one or more hosts, wherein the platform architecture provides a transducer functionality block, a conduit functionality block, an application functionality block, and an application programming interface (API) functionality block on which each task specific application instance is based, the platform architecture comprising:

computer-executable instructions, to be contained within a memory coupled to a processor, for providing the transducer functionality block and for configuring the transducer functionality block to provide transducer threads needed for the task specific application instance, wherein a transducer thread is adapted to receive input signals of a specified type in real time from a signal source, generate signal objects representing the input signals if the input signals are not already signal objects, wherein a signal object is an object structure that can be handled by the conduit functionality block and the application functionality block, and asynchronously publish the signal objects to at least one of the conduit functionality block and the application functionality block;

computer-executable instructions, to be contained within a memory coupled to a processor, for providing the conduit functionality block and for configuring the conduit functionality block to dynamically allocate conduits needed for the task specific application instance, wherein a conduit is a queue that receives signal objects of a particular type from at least one of a transducer, the application functionality block, and the API functionality block, and queues the signal objects for consumption by at least one of the transducer functionality block, the application functionality block, and the API functionality block;

computer-executable instructions, to be contained within a memory coupled to a processor, for providing the application functionality block and for configuring the application functionality block to receive signal objects from at least one of a conduit and a transducer, process the signal objects based on at least one script that is specifically adapted to perform processing needed for the task specific application instance, and perform an action based on the processing, wherein no storage of an input signal or a signal object that corresponds to the input signal occurs from the time the input signal is received until the action is performed except for queuing;

computer-executable instructions, to be contained within a memory coupled to a processor, for providing the API functionality block, wherein the API functionality block provides an interface for sending signal objects to and receiving signal objects from the conduit functionality block, and wherein the transducer threads and the script are started and stopped via the API functionality block;

wherein processing a signal object includes adding dynamic context to the signal object based on at least one of a time criterion, a space criterion, and a state criterion; and wherein adding dynamic context is performed by at least one of a pre-adapter, a dynamic context block, a post-adaptor, and an action in the application functionality block.

2. The platform architecture of claim 1 wherein the pre-adapter block is executed before any dynamic context block is executed and the post-adapter block is executed after any dynamic context block is executed.

3. The platform architecture of claim 1 wherein both the pre-adaptor block and the post-adaptor block are adaptable to generate a new signal object based on an existing signal object.

4. A platform architecture that is configurable to provide task specific application instances compatible with one or more hosts, wherein the platform architecture provides a transducer functionality block, a conduit functionality block, an application functionality block, and an application programming interface (API) functionality block on which each task specific application instance is based, the platform architecture comprising:

computer-executable instructions, to be contained within a memory coupled to a processor, for providing the transducer functionality block and for configuring the transducer functionality block to provide transducer threads needed for the task specific application instance, wherein a transducer thread is adapted to receive input signals of a specified type in real time from a signal source, generate signal objects representing the input signals if the input signals are not already signal objects, wherein a signal object is an object structure that can be handled by the conduit functionality block and the application functionality block, and asynchronously publish the signal objects to at least one of the conduit functionality block and the application functionality block;

computer-executable instructions, to be contained within a memory coupled to a processor, for providing the conduit functionality block and for configuring the conduit functionality block to dynamically allocate conduits needed for the task specific application instance, wherein a conduit is a queue that receives signal objects of a particular type from at least one of a transducer, the application functionality block, and the API functionality block, and queues the signal objects for consumption by at least one of the transducer functionality block, the application functionality block, and the API functionality block;

computer-executable instructions, to be contained within a memory coupled to a processor, for providing the application functionality block and for configuring the application functionality block to receive signal objects from at least one of a conduit and a transducer, process the signal objects based on at least one script that is specifically adapted to perform processing needed for the task specific application instance, and perform an action based on the processing, wherein no storage of an input signal or a signal object that corresponds to the input signal occurs from the time the input signal is received until the action is performed except for queuing;

computer-executable instructions, to be contained within a memory coupled to a processor, for providing the API functionality block, wherein the API functionality block provides an interface for sending signal objects to and receiving signal objects from the conduit functionality block, and wherein the transducer threads and the script are started and stopped via the API functionality block;

wherein the conduit functionality block is managed via a management conduit that is configured to de-allocate a signal object from a conduit if neither the application functionality block nor the API functionality block have subscribed to the conduit; and wherein the management conduit is further configured to de-allocate a conduit if the conduit is not associated with a transducer, the application functionality block, or the API functionality block.

5. A platform architecture that is configurable to provide task specific application instances compatible with one or more hosts, wherein the platform architecture provides a transducer functionality block, a conduit functionality block, an application functionality block, and an application programming interface (API) functionality block on which each task specific application instance is based, the platform architecture comprising:

computer-executable instructions, to be contained within a memory coupled to a processor, for providing the transducer functionality block and for configuring the transducer functionality block to provide transducer threads needed for the task specific application instance, wherein a transducer thread is adapted to receive input signals of a specified type in real time from a signal source, generate signal objects representing the input signals if the input signals are not already signal objects, wherein a signal object is an object structure that can be handled by the conduit functionality block and the application functionality block, and asynchronously publish the signal objects to at least one of the conduit functionality block and the application functionality block;

computer-executable instructions, to be contained within a memory coupled to a processor, for providing the conduit functionality block and for configuring the conduit functionality block to dynamically allocate conduits needed for the task specific application instance, wherein a conduit is a queue that receives signal objects of a particular type from at least one of a transducer, the application functionality block, and the API functionality block, and queues the signal objects for consumption by at least one of the transducer functionality block, the application functionality block, and the API functionality block;

computer-executable instructions, to be contained within a memory coupled to a processor, for providing the application functionality block and for configuring the application functionality block to receive signal objects from at least one of a conduit and a transducer, process the signal objects based on at least one script that is specifically adapted to perform processing needed for the task specific application instance, and perform an action based on the processing, wherein no storage of an input signal or a signal object that corresponds to the input signal occurs from the time the input signal is received until the action is performed except for queuing;

computer-executable instructions, to be contained within a memory coupled to a processor, for providing the API functionality block, wherein the API functionality block provides an interface for sending signal objects to and receiving signal objects from the conduit functionality block, and wherein the transducer threads and the script are started and stopped via the API functionality block;

wherein the conduit functionality block is managed via a management conduit that is configured to de-allocate a signal object from a conduit if neither the application functionality block nor the API functionality block have subscribed to the conduit; and wherein the management conduit is further configured to allocate a conduit for signal objects of a specified type if needed by at least one of a transducer, the application functionality block, and the API functionality block, and if a conduit is not currently allocated for signal objects of that specified type.

* * * * *